US011324196B2

(12) United States Patent
Reinke

(10) Patent No.: US 11,324,196 B2
(45) Date of Patent: May 10, 2022

(54) MODULAR INTERCHANGEABLE VESSEL SYSTEM ACCEPTING A PLURALITY OF ATTACHMENTS

(71) Applicant: Vapur, Inc., Oxnard, CA (US)

(72) Inventor: Brent A. Reinke, Newbury Park, CA (US)

(73) Assignee: VAPUR, INC., Oxnard, CA (US)

( * ) Notice: Subject to any disclaimer, the term of this patent is extended or adjusted under 35 U.S.C. 154(b) by 0 days.

(21) Appl. No.: 17/008,327

(22) Filed: Aug. 31, 2020

(65) Prior Publication Data

US 2021/0045350 A1 Feb. 18, 2021

Related U.S. Application Data

(63) Continuation-in-part of application No. 16/297,469, filed on Mar. 8, 2019, now Pat. No. 10,759,566, which is a continuation-in-part of application No. 15/659,512, filed on Jul. 25, 2017, now abandoned.

(60) Provisional application No. 62/948,718, filed on Dec. 16, 2019, provisional application No. 62/366,490, filed on Jul. 25, 2016.

(51) Int. Cl.
*A01K 7/06* (2006.01)
*B67D 3/00* (2006.01)

(52) U.S. Cl.
CPC .............. *A01K 7/06* (2013.01); *B67D 3/0061* (2013.01)

(58) Field of Classification Search
CPC ................. A01K 7/06; B67D 3/0061

USPC ......................................................... 222/224
See application file for complete search history.

(56) References Cited

U.S. PATENT DOCUMENTS

| 1,485,181 | A | * | 2/1924 | Grund | B43K 1/08 |
| | | | | | 401/214 |
| 2,678,630 | A | * | 5/1954 | Frederiksen | A01K 7/06 |
| | | | | | 119/75 |
| 2,726,636 | A | * | 12/1955 | Frederiksen | A01K 7/06 |
| | | | | | 119/72.5 |
| 3,111,703 | A | * | 11/1963 | Kaufman | A45D 34/041 |
| | | | | | 401/214 |
| 3,228,377 | A | * | 1/1966 | Grassano | A01K 7/02 |
| | | | | | 119/72.5 |
| 3,303,824 | A | * | 2/1967 | Anderson | A01K 7/02 |
| | | | | | 119/72.5 |
| 3,355,241 | A | * | 11/1967 | Rowe | A45D 34/041 |
| | | | | | 401/213 |
| 3,566,844 | A | * | 3/1971 | Occhiodori | A01K 7/06 |
| | | | | | 119/72.5 |

(Continued)

*Primary Examiner* — Paul R Durand
*Assistant Examiner* — Michael J. Melaragno
(74) *Attorney, Agent, or Firm* — Gates & Cooper LLP

(57) ABSTRACT

A method and apparatus for dispensing a liquid when licked is disclosed. The apparatus comprises a substantially spherical member; a cap member, and a valve. The cap member comprise a concave member adapted to accept a spherical cap and retaining the spherical member within the concave member while forming a volume therebetween, and a valve, in sealed hydraulic communication with the volume between the spherical member and the concave member, the valve permitting fluid communication between the volume and a vessel sealingly affixed to the cap member in a first configuration and prohibiting fluid communication between the volume and the vessel in a second configuration.

16 Claims, 26 Drawing Sheets

(56) References Cited

U.S. PATENT DOCUMENTS

| | | | | |
|---|---|---|---|---|
| 3,771,496 A * | 11/1973 | Atchley | A01K 7/06 | 119/72.5 |
| 4,164,377 A * | 8/1979 | Lohrman | A45D 34/041 | 401/213 |
| 4,368,184 A * | 1/1983 | Drucker | A45D 33/12 | 222/414 |
| 4,436,125 A * | 3/1984 | Blenkush | F16L 37/0841 | 137/797 |
| 4,605,554 A * | 8/1986 | Prussin | A45D 34/041 | 424/65 |
| 4,940,350 A * | 7/1990 | Kim | A45D 34/041 | 401/209 |
| 5,033,777 A * | 7/1991 | Blenkush | F16L 37/0841 | 285/317 |
| 5,553,957 A * | 9/1996 | Dornbusch | A45D 34/041 | 401/209 |
| 5,607,087 A * | 3/1997 | Wery | B67D 1/0456 | 222/401 |
| 5,722,573 A * | 3/1998 | Carnel | A45F 3/16 | 224/148.2 |
| 5,816,457 A * | 10/1998 | Croft | A45F 3/20 | 224/148.2 |
| 5,845,943 A * | 12/1998 | Ramacier, Jr | F16L 37/42 | 285/12 |
| 5,924,678 A * | 7/1999 | Olde | A01K 7/06 | 251/348 |
| 6,095,708 A * | 8/2000 | Butaud | A45D 34/041 | 401/209 |
| 6,231,089 B1 * | 5/2001 | DeCler | F16L 37/0841 | 285/308 |
| 6,293,226 B1 * | 9/2001 | Hwang | A01K 7/06 | 119/72 |
| 6,612,466 B1 * | 9/2003 | Malin | B29C 65/18 | 222/107 |
| 6,718,912 B2 * | 4/2004 | Pappas | A01K 1/0356 | 119/72.5 |
| 6,722,533 B2 * | 4/2004 | Skillern | A45F 3/20 | 222/175 |
| 6,860,406 B2 * | 3/2005 | Kobetsky | B29C 65/18 | 222/92 |
| 6,908,015 B2 * | 6/2005 | Choi | F16L 37/0841 | 222/175 |
| 7,051,676 B1 * | 5/2006 | Deshaies | A01K 7/06 | 119/72.5 |
| 7,117,818 B2 * | 10/2006 | Pappas | A01K 1/0356 | 119/72.5 |
| 7,311,231 B2 * | 12/2007 | Noell | A45F 3/20 | 215/388 |
| D577,584 S * | 9/2008 | Porter | D9/447 | |
| 7,618,208 B2 * | 11/2009 | Baines | A45D 40/261 | 401/213 |
| 7,806,300 B1 * | 10/2010 | Noell | A45F 3/20 | 222/175 |
| 8,152,138 B2 * | 4/2012 | Skillern | A45F 3/16 | 251/342 |
| 8,596,220 B2 * | 12/2013 | Mainini | A01K 15/02 | 119/72 |
| 8,764,068 B2 * | 7/2014 | Frick | F16L 37/62 | 285/317 |
| 8,851,778 B2 * | 10/2014 | Neto | A45D 40/261 | 401/209 |
| 8,899,863 B2 * | 12/2014 | Geiger | A45D 40/261 | 401/213 |
| 9,016,505 B2 * | 4/2015 | Canegallo | B65D 75/5866 | 220/277 |
| 9,157,560 B2 * | 10/2015 | Rehder | F16L 37/32 | |
| 9,506,590 B2 * | 11/2016 | Wilhelm | F16L 37/413 | |
| 10,040,312 B2 * | 8/2018 | Orem | B43K 1/082 | |
| 2004/0256424 A1 * | 12/2004 | Johnson | F16L 37/32 | 222/518 |
| 2005/0001425 A1 * | 1/2005 | deCler | F16L 37/34 | 285/305 |
| 2005/0012330 A1 * | 1/2005 | Schmidt | F16L 37/0841 | 285/317 |
| 2005/0072804 A1 * | 4/2005 | Brown | A45F 3/20 | 222/175 |
| 2006/0049372 A1 * | 3/2006 | Lien | F16L 55/1108 | 251/7 |
| 2007/0075094 A1 * | 4/2007 | Brown | A45F 3/20 | 222/175 |
| 2007/0108158 A1 * | 5/2007 | Stribling | B65D 35/46 | 215/389 |
| 2010/0072232 A1 * | 3/2010 | Rider | A45F 3/16 | 222/610 |
| 2010/0313817 A1 * | 12/2010 | Krasner | A01K 7/00 | 119/72.5 |
| 2011/0088628 A1 * | 4/2011 | Valeriano | A01K 39/0213 | 119/75 |
| 2013/0161350 A1 * | 6/2013 | Murrieta | A61J 15/0011 | 222/105 |
| 2013/0186906 A1 * | 7/2013 | Underhill | A45F 3/16 | 220/705 |
| 2017/0121168 A1 * | 5/2017 | Johnson | B65D 75/5877 | |
| 2017/0225852 A1 * | 8/2017 | Ohkubo | B65D 75/008 | |
| 2017/0245466 A1 * | 8/2017 | Adams | A01K 7/06 | |
| 2019/0269228 A1 * | 9/2019 | Czerwinski | B65D 25/48 | |

\* cited by examiner

MODULAR INTERCHANGEABLE VESSEL SYSTEM ACCEPTING A PLURALITY OF ATTACHMENTS

CROSS-REFERENCE TO RELATED APPLICATIONS

This application claims benefit of U.S. Provisional Patent Application 62/948,718, entitled "MODULAR INTERCHANGEABLE VESSEL SYSTEM ACCEPTING A PLURALITY OF ATTACHMENTS," by Brent Reinke, filed Dec. 16, 2019.

This application is also a continuation-in-part of U.S. patent application Ser. No. 16/297,469, entitled "MODULAR INTERCHANGEABLE VESSEL SYSTEM ACCEPTING A PLURALITY OF ATTACHMENTS," by David Czerwinski and Brent Reinke, filed May 8, 2019, now issued as U.S. Pat. No. 10,759,566, which application is a continuation-in-part of U.S. patent application Ser. No. 15/659,512, entitled "MODULAR INTERCHANGEABLE VESSEL SYSTEM ACCEPTING A PLURALITY OF ATTACHMENTS," by David Czerwinski and Brent Reinke, filed Jul. 25, 2017, which application claims benefit of U.S. Provisional Patent Application No. 62/366,490, entitled "MODULAR INTERCHANGEABLE VESSEL SYSTEM ACCEPTING A PLURALITY OF ATTACHMENTS," by David Czerwinski and Brent Reinke, filed Jul. 25, 2016, all of which applications are hereby incorporated by reference herein.

BACKGROUND

1. Field

The present disclosure relates to systems and methods for storing and dispensing water and other consumable liquids, and in particular to a modular interchangeable flexible vessel such as a water bottle, jug, or reservoir system incorporating a unique fitment that quickly and easily accepts a plurality of attachments and a method for using same.

2. Description of the Related Art

Personal hydration is an important health consideration for people of all ages and activity levels. Convenient and effective hydration is especially important to those leading active lifestyles Unfortunately, many personal hydration products are typically designed for a specific activity, and are incompatible or unpractical for other active uses. For example, many people engaged in active lifestyles own rigid water bottles for use while at the gym, running, traveling, or biking. The same user may prefer consuming water from a soft reservoir with a drink tube stored inside of a pack for backpacking, hiking, trail running, snowboarding, skiing, hunting, and paddle sports While effective for their purpose, larger size soft reservoirs cannot practically be used as handheld water bottles for other sporting activities as they are not designed to retain their shape, are not self-supporting, and cannot be easily drank from without the entire personal hydration apparatus. Rigid water bottles on the other hand cannot be practically used as hydration reservoirs due to their bulky rigid shape and size. Further, many users engaged in active lifestyle prefer different drinking cap, closure and spout systems for each activity. For example, a user may prefer using a "bite valve" one handed cap system for running and a secure high flow two hand cap for use during travel and/or hiking.

What is needed is a single system and method that is adaptable, by use of accessories and attachments to provide personal hydration for a wide variety of active lifestyles and activities. What is also needed is a removable attachment usable with such system that permits the dispensing of liquids to pets. Such a system and method is disclosed herein.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To address the requirements described above, this document discloses a system and method for dispensing liquid when licked and otherwise retaining liquid. In one embodiment, the apparatus comprises a substantially spherical member, a cap member, and a valve. The cap member comprises a concave member, the concave member adapted to accept a spherical cap having a polar angle of more than 180 degrees of the substantially spherical member within the concave member, thereby retaining the spherical member within the concave member while forming a volume therebetween. The valve is in sealed hydraulic communication with the volume between the spherical member and the concave member, the valve permitting fluid communication between the volume and a vessel sealingly affixed to the cap member in a first configuration and prohibiting fluid communication between the volume and the vessel in a second configuration, the valve configured to in the first configuration when the spherical member is urged into the cap member.

Another embodiment is evidenced by a method of providing liquid to a pet using the foregoing apparatus.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Figure 1:
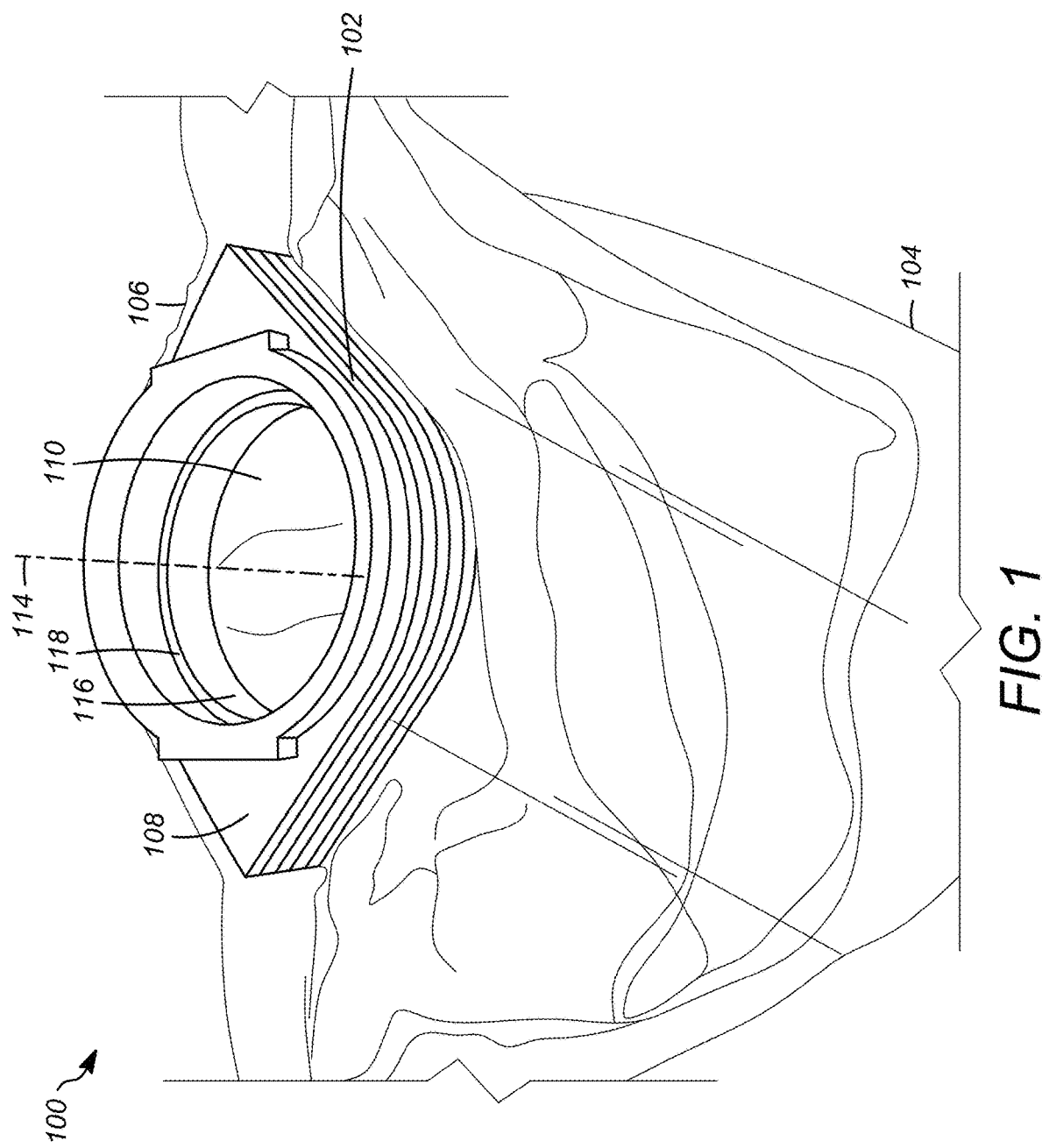
FIG. 1 is a diagram illustrating one embodiment of a flexible and flat-foldable water vessel.
Figure 2A:
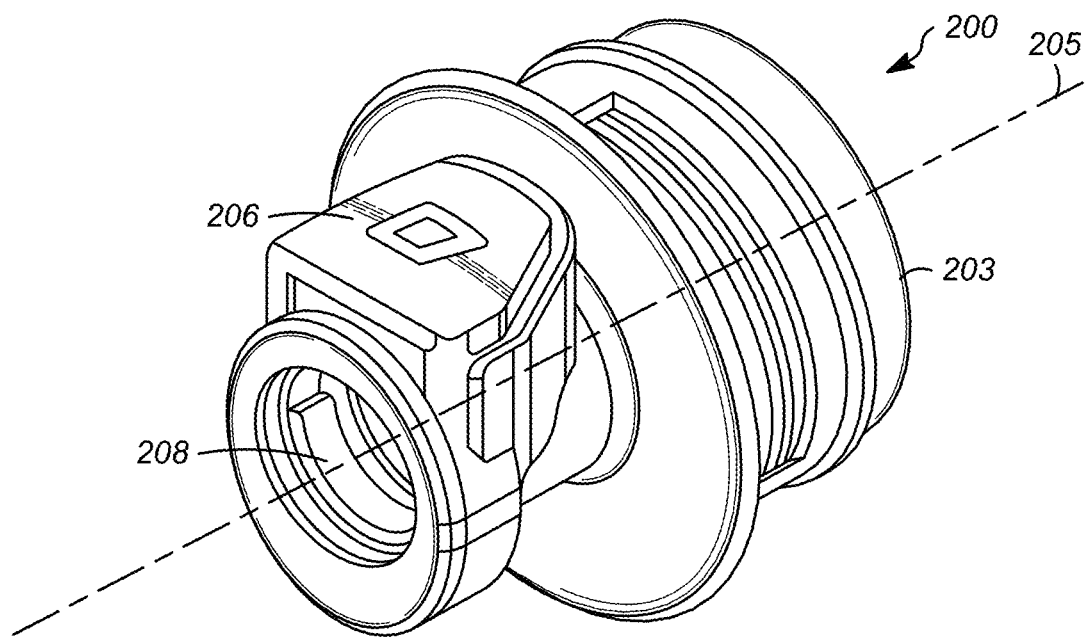
FIGS. 2A-2D are diagrams depicting one embodiment of a socket that may be inserted and sealingly fastened within the kayak aperture.
Figure 2B:
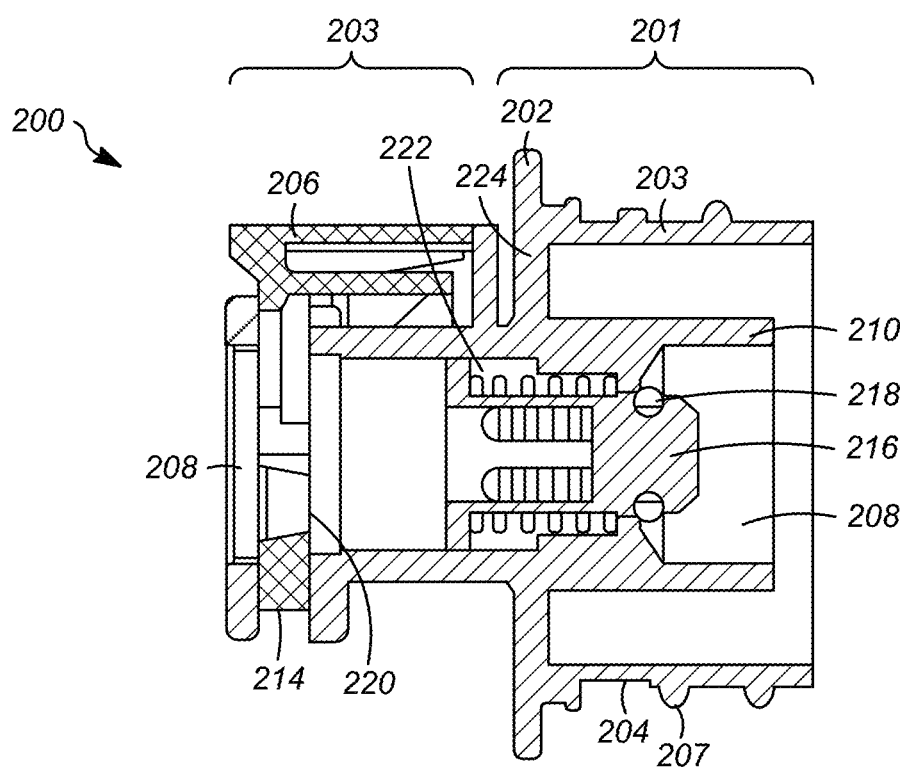
Figure 2C:
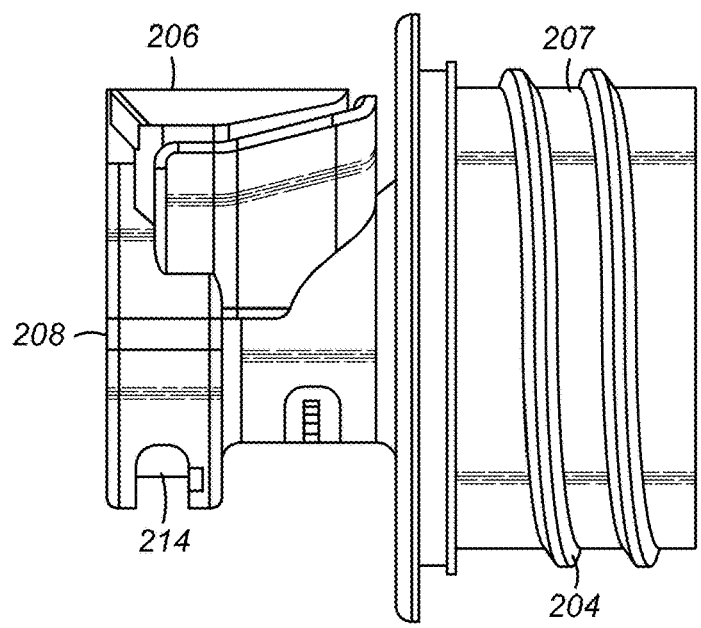
Figure 2D:
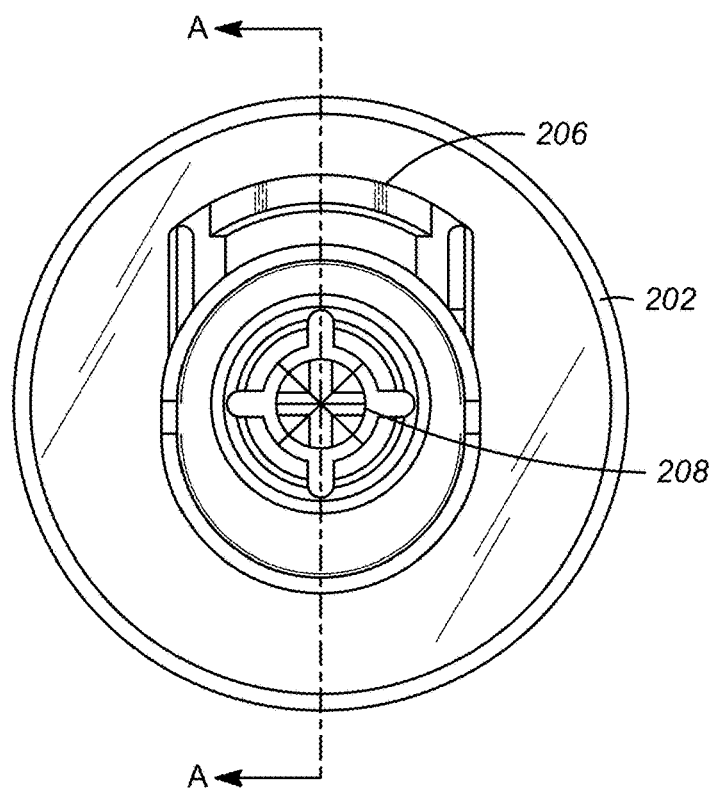

FIG. 1 is a diagram depicting one embodiment source of liquid comprising a flexible and foldable water vessel 100 for use in the interchangeable vessel system. The vessel 100 comprises a sealed end 104 and an unsealed end 106 disposed distal from the sealed end 104. The unsealed end 106 comprises a kayak-shaped end piece 108 that is sealingly coupled to the unsealed end 106.

The kayak-shaped end piece 108 further comprises a kayak aperture 110 extending therethrough along a kayak-aperture longitudinal axis 114. The kayak aperture 110 has a circular cross-section and a kayak threaded surface 116 parallel to the kayak aperture longitudinal axis 114 sized and shaped to accept a socket 200 depicted in FIGS. 2A-2D below. The kayak aperture has internal threads 118 that couple with associated threads on the socket 200 to sealingly hold the socket 200 within the kayak aperture 110. The socket permits connection of different components, thus creating a hydration and water storage and dispensing system otherwise referred to as DRINKLINK.

FIGS. 2A-2D are diagrams depicting one embodiment of a socket 200 that may be inserted and sealingly fastened within the kayak aperture 110. The socket 200 forms an important part of the DRINKLINK system, as it permits different elements to be removably coupled together, as described further below. In this embodiment, the socket 200 comprises a cap portion 201 that is placed within the kayak aperture 110 and a latch portion 251 that is used to accept attachments with a lip portion 202 therebetween. The cap portion 201 comprises a first male portion 203 having a first male portion longitudinal axis 205.

The first male portion 203 includes a male portion threaded 207 surface 204, that, when the first male portion 203 is inserted in the kayak aperture 110 and rotated about axis 205 (collinear with axis 114) to screw the male portion 203 into the kayak aperture 110, engages the threaded surface of the kayak aperture 110 to sealingly hold the socket 200 in place on the vessel.

The socket 200 also comprises a second male portion 210 coupled to the first male portion 203. The second male portion 210 extends longitudinally and coaxially through the first male portion 203, and includes a female aperture portion 208 that extends longitudinally and coaxially through the second male portion 210 and also through the first male portion 203. The first male portion 203 and the second male portion 210 are coupled via socket portion 224, which runs substantially perpendicular to the first male portion longitudinal axis 205, and seals the first male portion 203 to the second male portion 210.

In the illustrated embodiment, the second male portion 210 is disposed completely within the first male portion 203, and coaxially with the first male portion 203. As further described below, this design places the second male portion 210 (as well as third male portion 216, when inserted into female portion 208) within the first male portion 203, and hence, within the kayak aperture 110, thus reducing the distance that socket 200 extends from the kayak aperture 110 when inserted therein. This makes for a more compact assembly of the socket 200 and vessel 100 when assembled, subjects the external portions (including the latch 206, and latch locking member 214 and any attachments) to reduced load moments, making them more durable in the event that the assembly is dropped, and reducing the probability that the valve assembly will experience lower temperatures and be subject to icing. In one embodiment, the second male portion 203 is inserted substantially within the first male portion 201, such that the valve assembly is sufficiently insulated to prevent formation of ice under normal use.

The socket 200 latch portion 251 comprises a latch 206 that is slidably coupled to the second male portion 210. When the latch 206 is slidably moved, the female aperture 208 is partially occluded by a portion of the latch, the latch locking member 214.

The vessel system also includes a plurality of different attachments that are insertable into the female aperture portion 208 of the second male portion 210. These attachments include a third male portion 216 that has an outer surface substantially conforming to the inner surface of the female aperture portion 208. The third male portion 216 is inserted into the female aperture portion 208, and held in place by engagement of the latch locking member 214 with a latching surface 220 of the third male portion 216. O-ring 218 provides waterproof mating of the third male portion 216 and the female aperture portion 208. Upon disengagement of the latch 214 with the latching surface 220, spring 222 urges the third male portion out of the female aperture portion 208

Figure 3A:
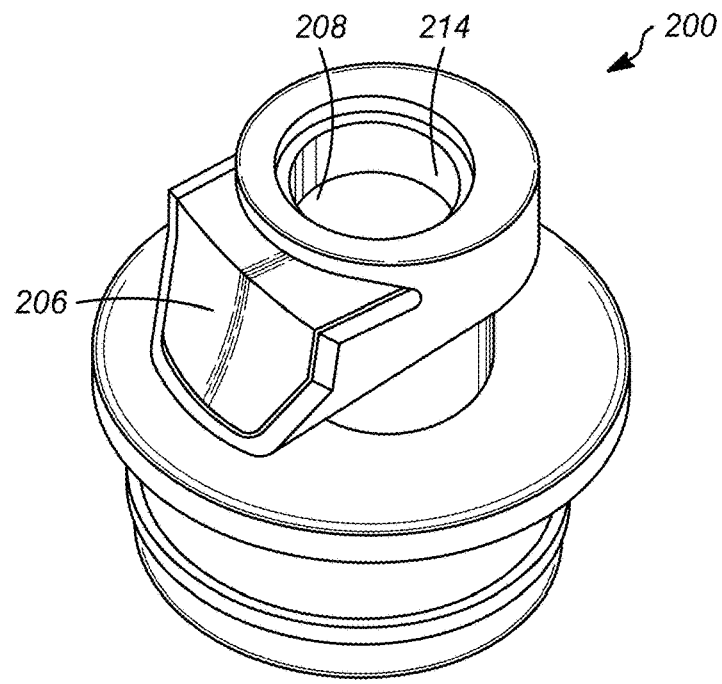
FIGS. 3A and 3B are diagrams depicting the socket and an attachment.
Figure 3B:
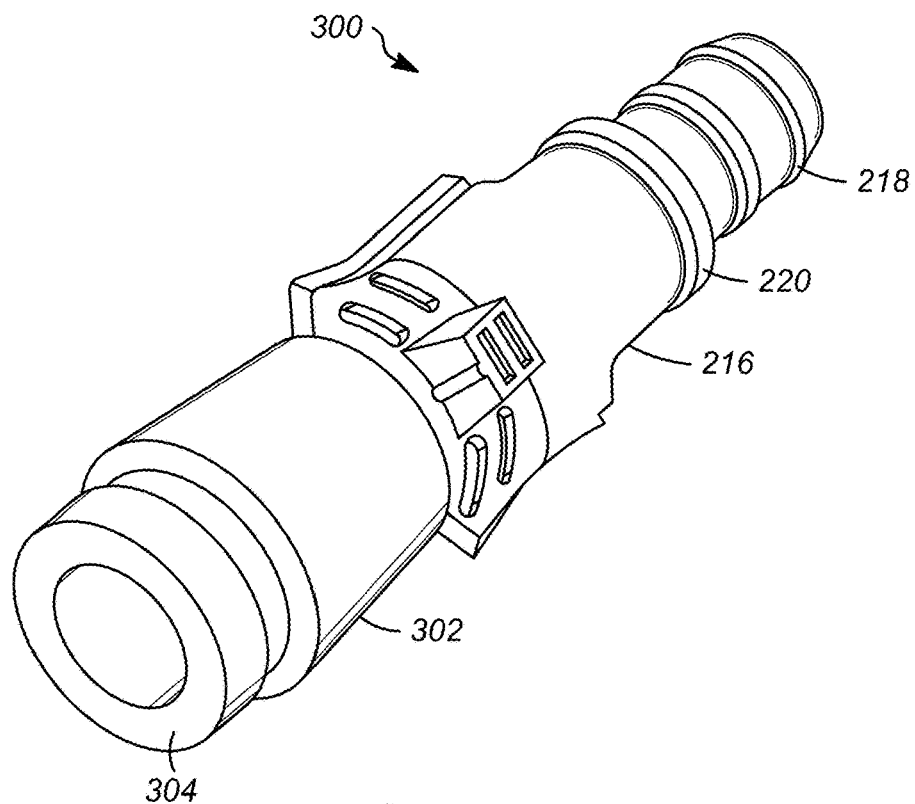

FIGS. 3A and 3B are diagrams depicting the socket 200 and one embodiment of an attachment 300. The attachment 300 includes the third male portion 216 and a tube portion 302 that may be slid over friction surfaces on third male portion 216 for a waterproof seal and fluid connectivity.

As illustrated, the tube portion 302 may comprise a short tube with a bite valve 304 attachment. So configured, when the socket 200 is screwed into the kayak aperture 110, the female aperture portion 208 is presented. The third male portion 216 of a consumption attachment 300 may then be inserted into the female aperture portion 208.

The attachment 300 may be of different embodiments. In one embodiment, the attachment comprises a short (0.5-2 inch) tube 302 or straw and a bite valve 304 on the end of the tube 302 distal from the third male member 216. This configures the vessel system for use as a water bottle.

Figure 4:
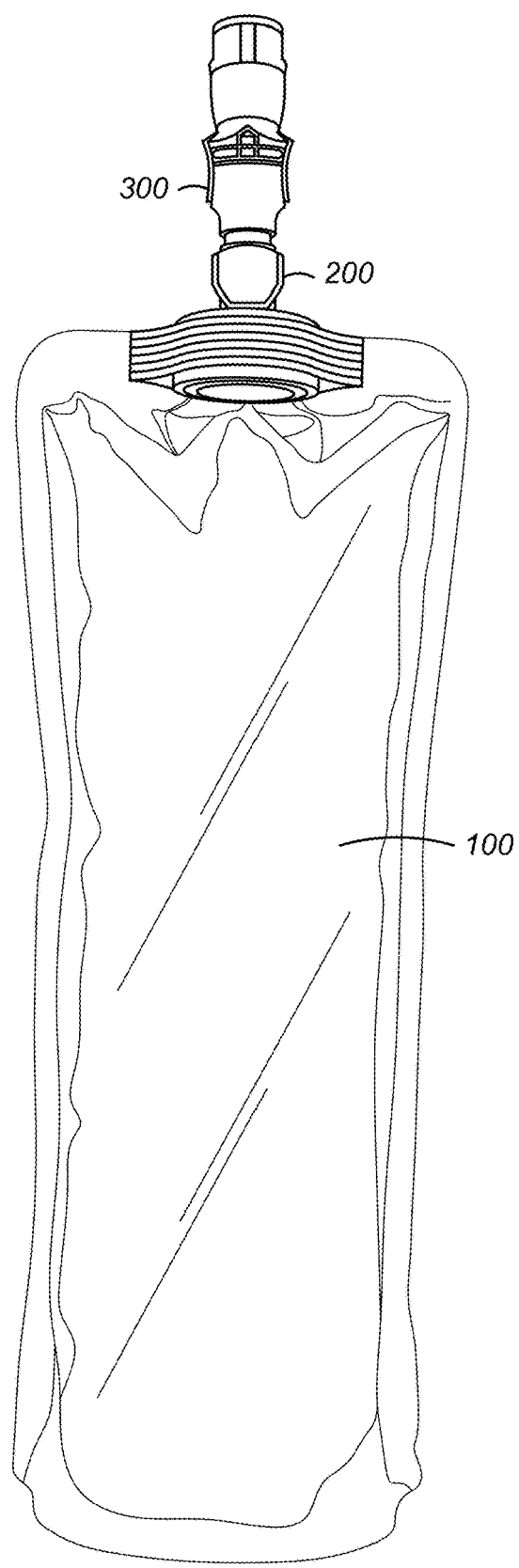
FIG. 4 is a diagram depicting another embodiment of an attachment installed on a vessel via the socket.

FIG. 4 is a diagram of one embodiment of a DRINKLINK system 500 in a water bottle configuration. The DRINKLINK system includes a vessel 100, socket 200 inserted into the kayak and an attachment 300, having a third male member 216 inserted into the female aperture portion 208. In the illustrated embodiment, the attachment 300 comprises a simple bite valve, such as the bite valve 304 shown in FIG. 3. When configured as illustrated in FIG. 4, the DRINKLINK system 500 is configured for use as a water bottle.

Figure 5:
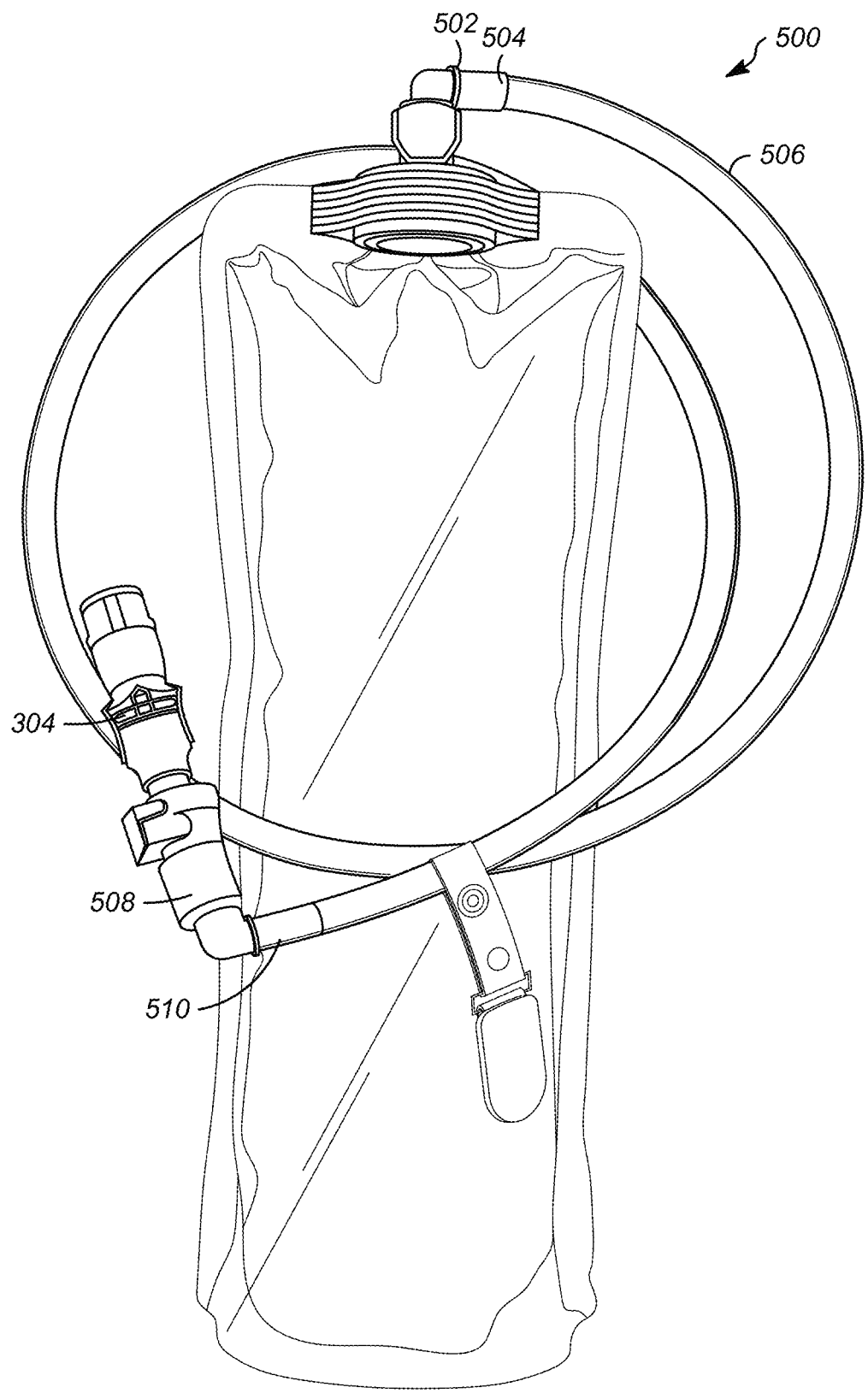
FIGS. 5-20 are diagrams depicting various embodiments of the interchangeable vessel system.

FIG. 5 is a diagram of another embodiment of the DRINKLINK system 500 configured to position the bite valve 304 further remotely from the bladder. In the illustrated embodiment, the socket 200 is inserted into and sealingly affixed to the aperture of the kayak, and a male member portion analogous to the third male portion 216 of an attachment 502 is inserted into the female aperture portion 208 of the socket 200. In addition to the male member portion, attachment 502 also comprises a ribbed male portion 504 that can be sealingly inserted into a tube 506, thus placing the tube 506 into fluid communication with the vessel 100. In the illustrated embodiment, the attachment 502 is a right angle attachment, but other configurations can also be included in the DRINKLINK system 500.

The tube 506 can be of a variety of lengths (e.g. 10-36 inches). At the distal end of the tube 506, another embodiment of the socket 508 may be used. This socket 508 uses a ribbed portion 510 that is sealingly inserted into the tube 506 on one end, and on the other end, includes a structure analogous to the socket latch portion 251. This allows attachments and accessories (such as bit valve 304) to be sealingly attached to the tube 506 via the socket 508. This allows the flexible vessel 100 to be inserted into a pocket of a backpack, while also allowing the user to draw liquid through the tube and bite valve 304 external to the pocket of the backpack for use in a personal hydration system.

Figure 6:
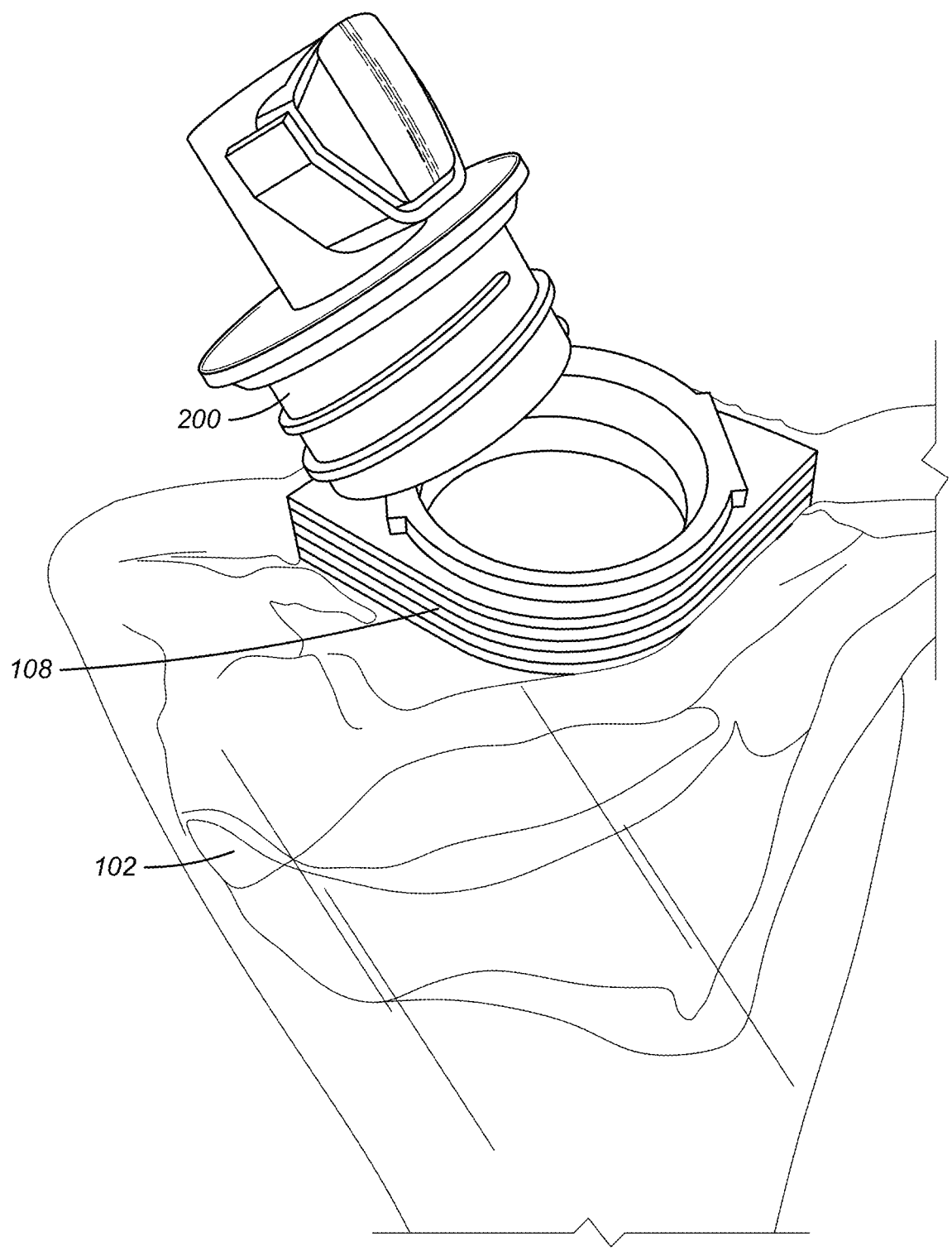

FIG. 6 is a diagram of the vessel 100 and end piece 108, as well as the socket 200 having threads matching the threaded structure of the end piece 108. The socket 200 is shown being inserted into the end piece 108.

Figure 7:
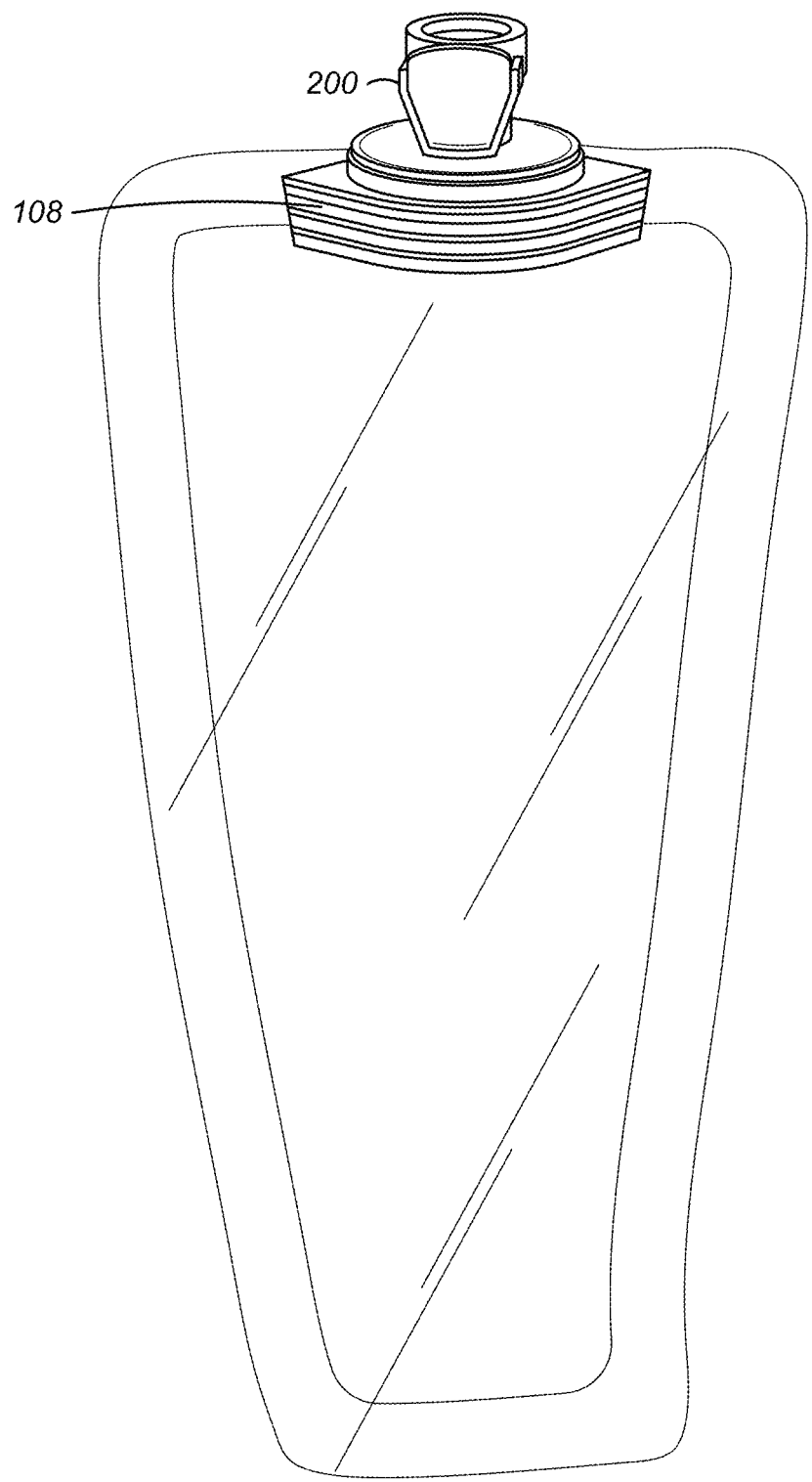

FIG. 7 is a diagram of the vessel 100 after the socket 200 is affixed to the end piece 108 by screwing the socket threads into the end piece 108.

The DRINKLINK interchangeable vessel system also includes water vessels that are not used for personal hydration. For example, the DRINKLINK interchangeable vessel system can include a larger size vessel (e.g. one or more gallons in size) that can be used to dispense water (or other consumable liquids) using a spigot or a shower head attachment. The larger size vessels may be used to provide water (or other consumable and/or non-consumable liquids) from such vessel to a variety of accessories via one or more sockets 200 and similar couplers.

Figure 8:
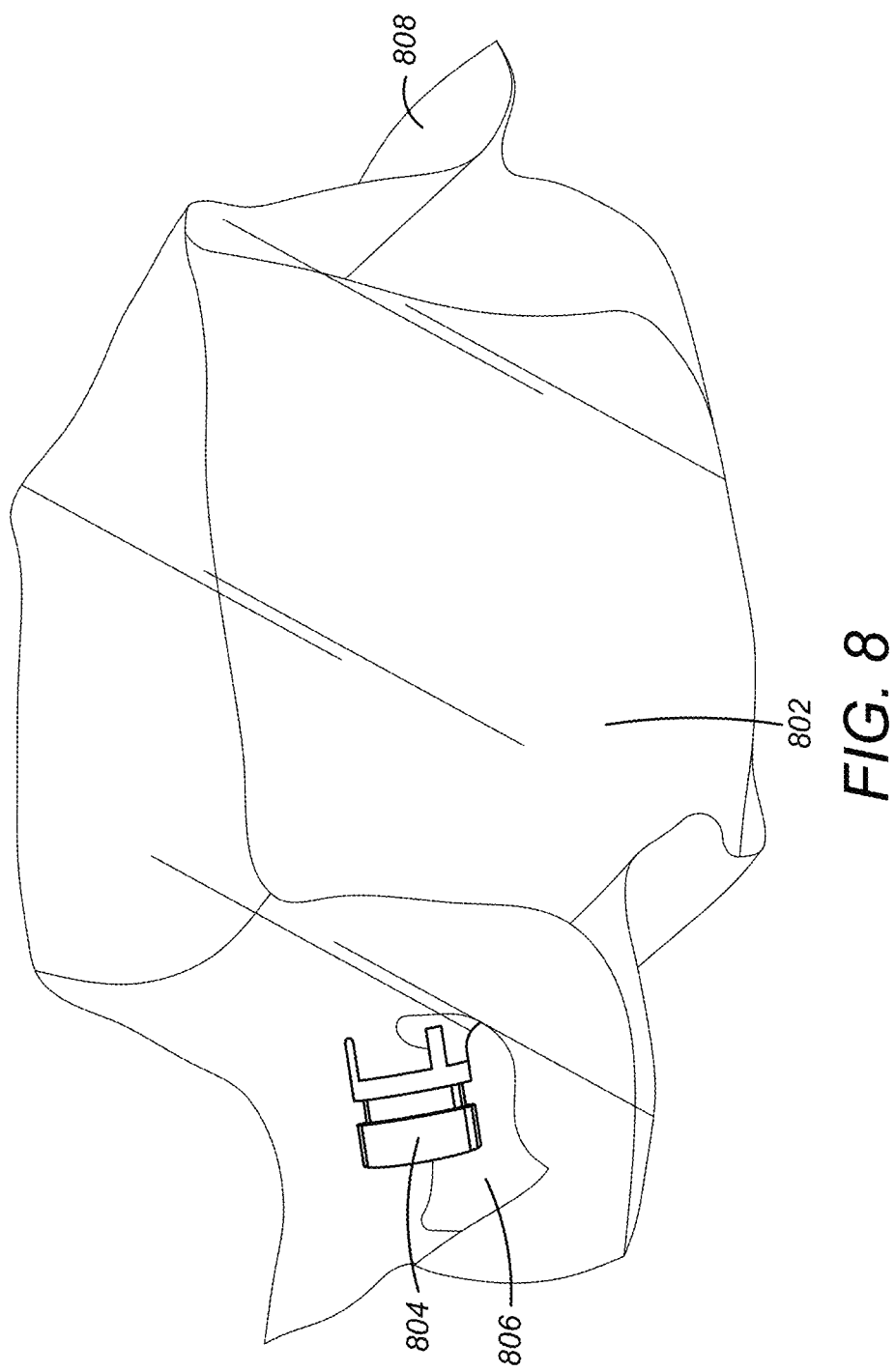

FIG. 8 is a diagram of another embodiment of a larger capacity vessel 802. In this embodiment, the vessel 802 is not typically used for personal hydration (e.g. it is not carried by the user), but is instead, holds a greater volume of water or other consumable liquids (for example, greater than one gallon). In the illustrated embodiment, the vessel 802 is cube-like in shape, and thus includes a flat side, allowing the vessel to be placed on its side on a surface. This embodiment of the vessel 802 also includes a handle 806 on at least one end of the vessel, thus allowing the vessel 802 to be easily carried about (in spite of a weight of about 20 pounds when full), and allowing the vessel 802 to be hung from a supporting structure. The vessel 802 may also include a second handle on the opposing side of the vessel 802. In the illustrated embodiment, the vessel 802 is sealingly closed with a cap placed on a threaded structure 804.

Depending on the structure of vessel 802, the socket 200 may be screwed into a kayak-shaped end piece 108 (if the associated portion of the vessel is folded analogously to vessel 100), however, other embodiments are possible where the socket 200 is simply screwed into or otherwise attached to an aperture of the vessel 802 having matching physical features. Of course, while socket 200 and other structures are illustrated as screwing into complimentary structures on other elements, other embodiments may be used in which the socket 200 sealingly snaps into the appropriate structure.

Figure 9:
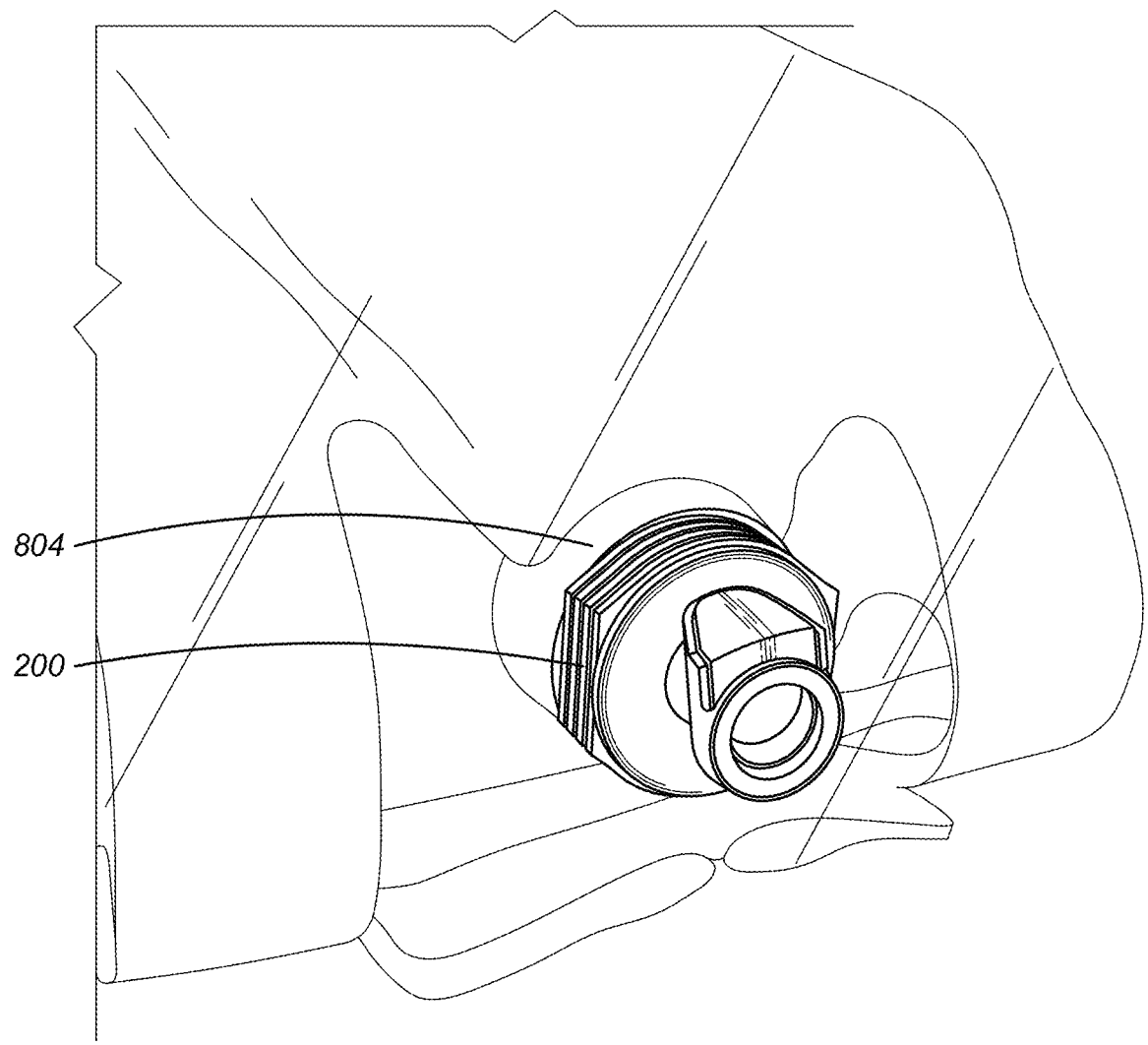

FIG. 9 is a diagram of the vessel 802 with the socket 200 threaded into the threaded structure 804.

Figure 10:
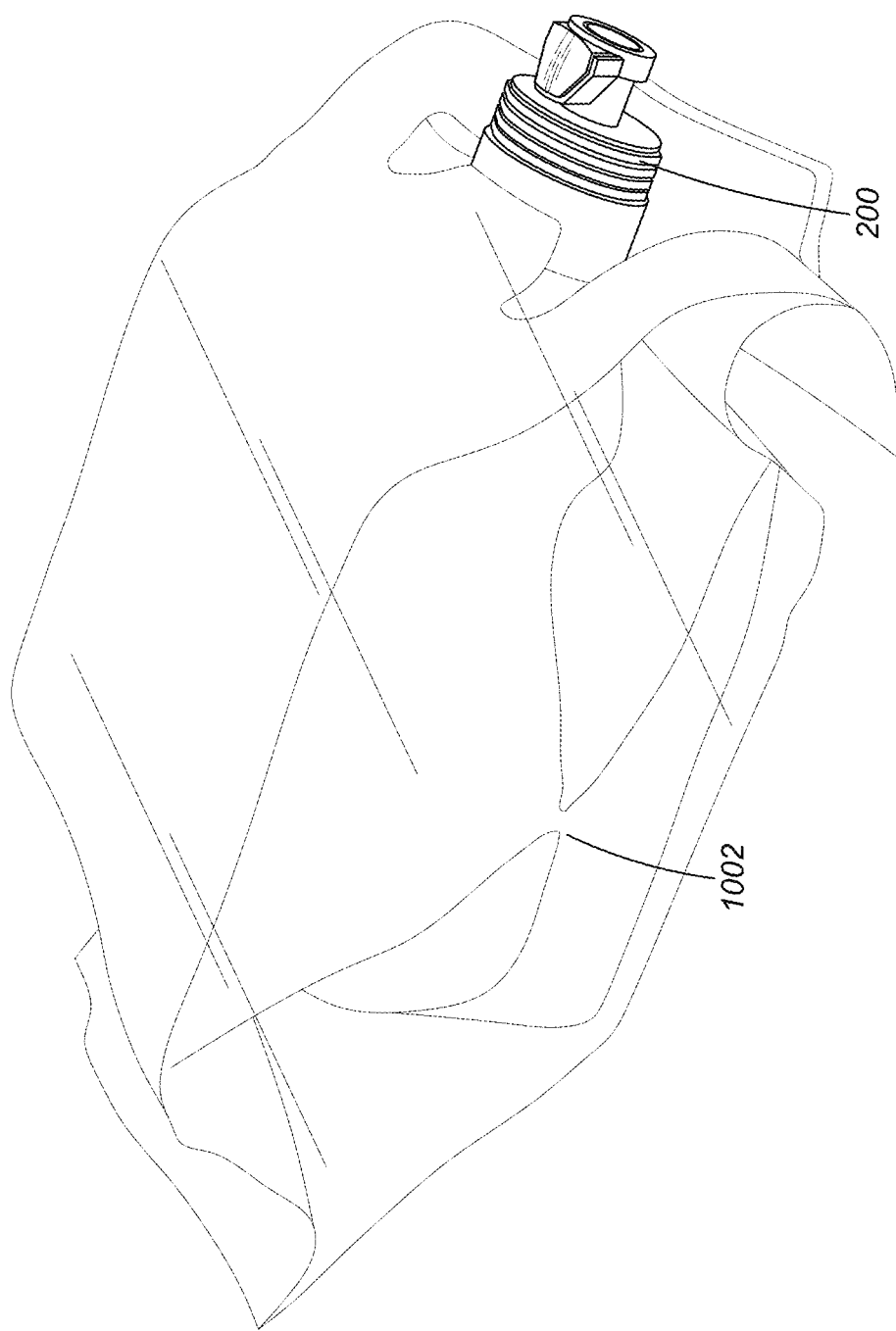

FIG. 10 is a diagram of the vessel 802, showing the cube shape and folds 1002 that allow the vessel 802 to be folded flat.

Figure 11:
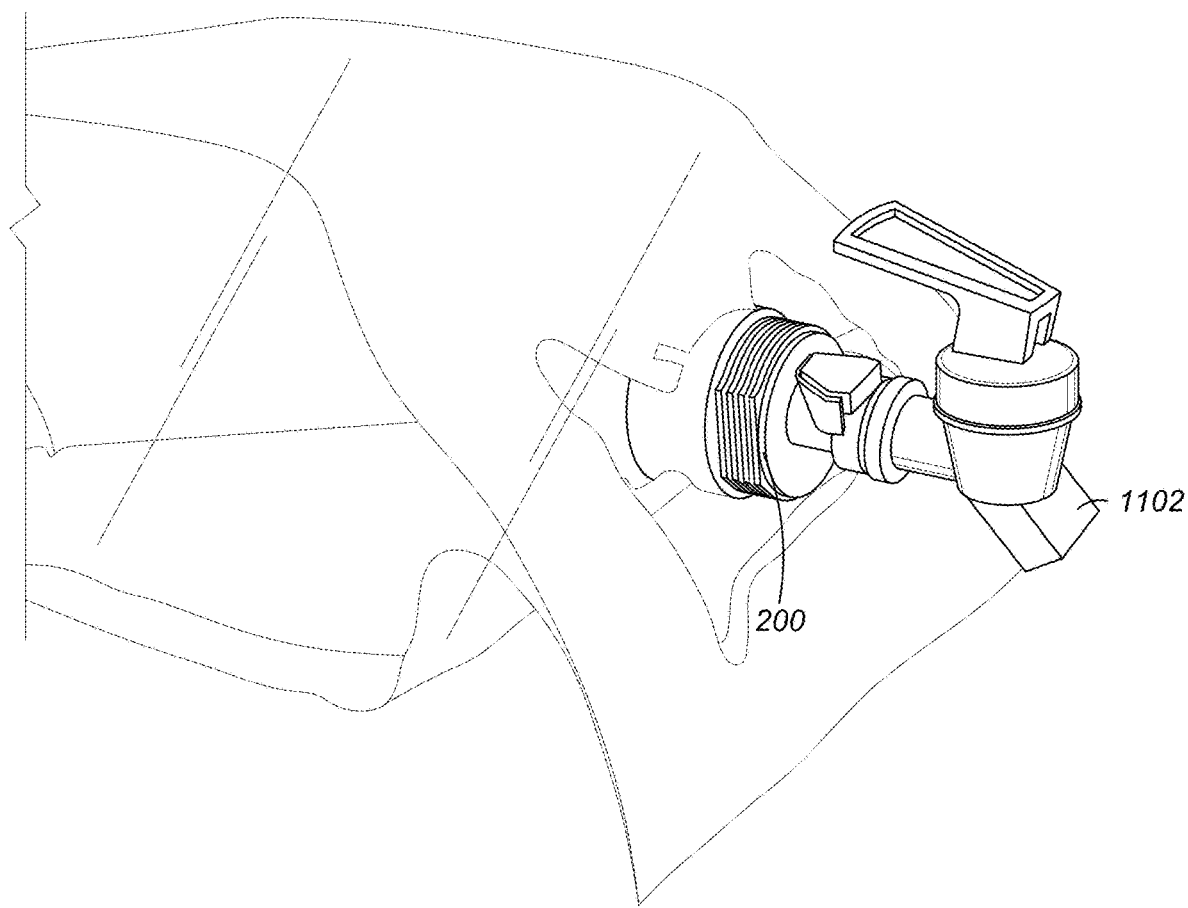

FIG. 11 is a diagram of a spigot 1102 that can be inserted into the socket 200 female aperture portion 208. Although not illustrated, the spigot 1102 has a male portion 216 similar to the male portion 216 of FIG. 3, that is inserted into the female aperture portion 208 of the socket 200. The spigot 1102 allows the vessel 802 to easily dispense consumable liquids into cups and similar vessels. Thus, the vessel 802 and spigot 1102 may be placed on a table or other flat surface, and be used to dispense consumable liquids.

Figure 12:
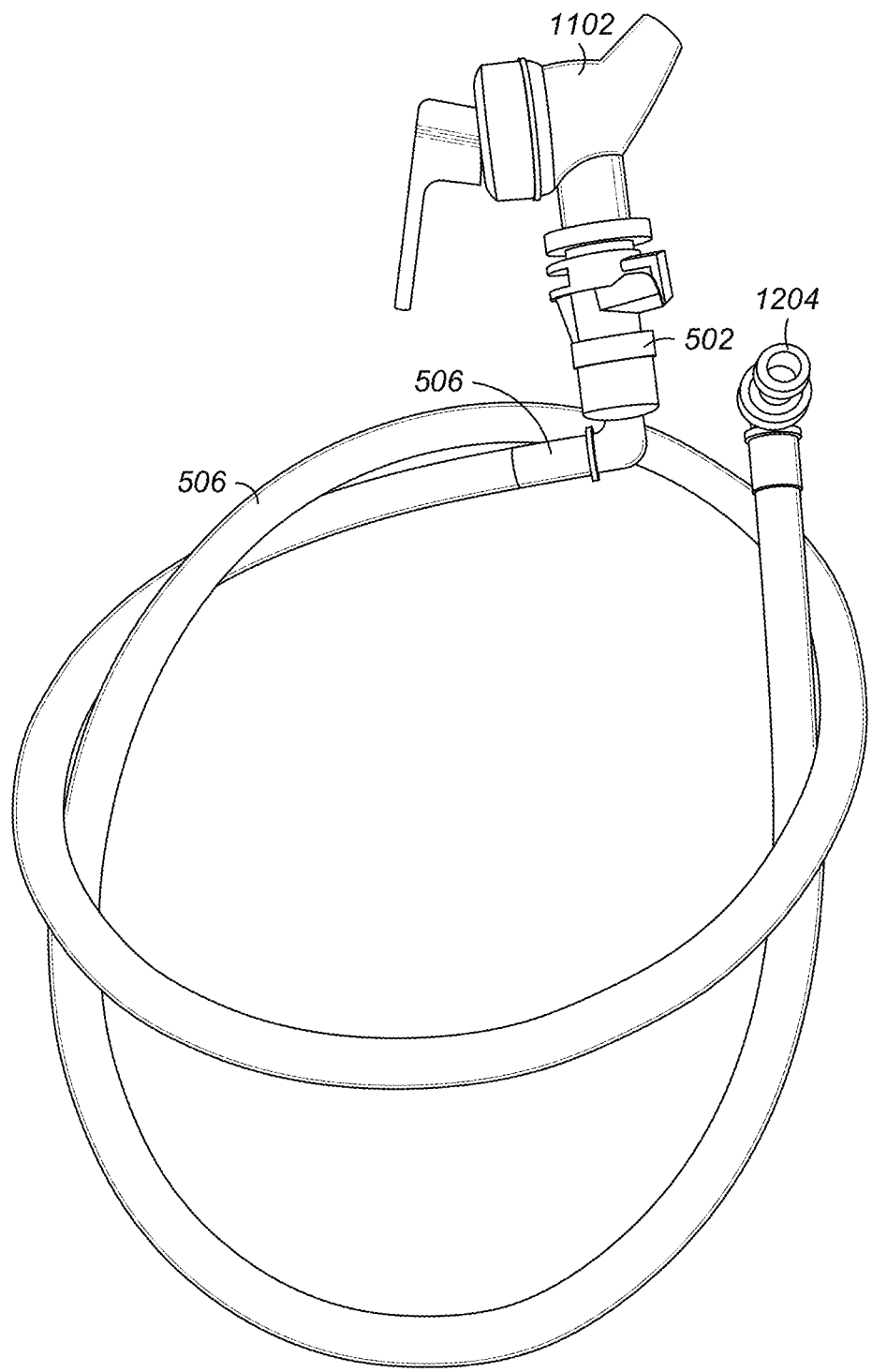

FIG. 12 is a diagram of the spigot 1102 attached to a tube 506 via a socket 502 having a right angle bend. As described above, this embodiment of the socket 502 does not comprise a threaded male portion 203, but rather, a ribbed male portion 504 that is inserted into the tube 506 to place the tube 506 and the socket 502 in sealed fluid communication. Spigot 1102 is inserted into the other end of the socket 502, which has a structure analogous to the latch portion 251 of socket 200. Attachment/coupler 1204 comprises a right angle joint having a similar ribbed male portion for insertion into the tube 506 and a male portion similar to male portion 216 that is inserted into the female aperture portion of a socket 200.

Figure 13A:
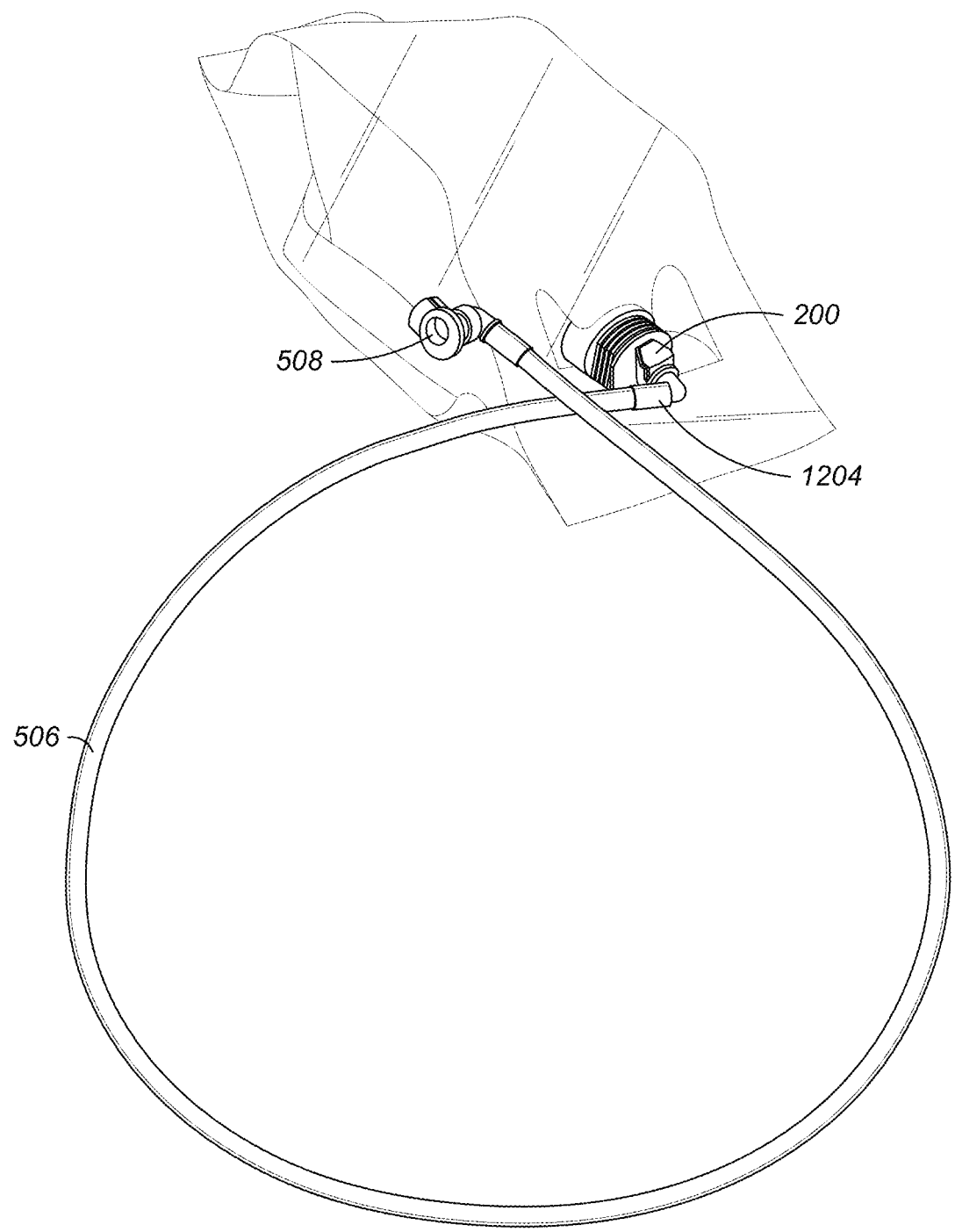

FIG. 13A is a diagram showing the socket 200 installed in the vessel 802, and the coupler 1204 installed in the socket 200. The coupler 1204 has a ribbed portion inserted into the interior of the tube 1206. Socket 508 having a ribbed male portion disposed at a right angle is inserted other end of the tube 1206. In this configuration, accessories may be inserted into the other end of socket 508, which has a structure analogous to the socket 200, as further illustrated and described below.

Figure 13B:
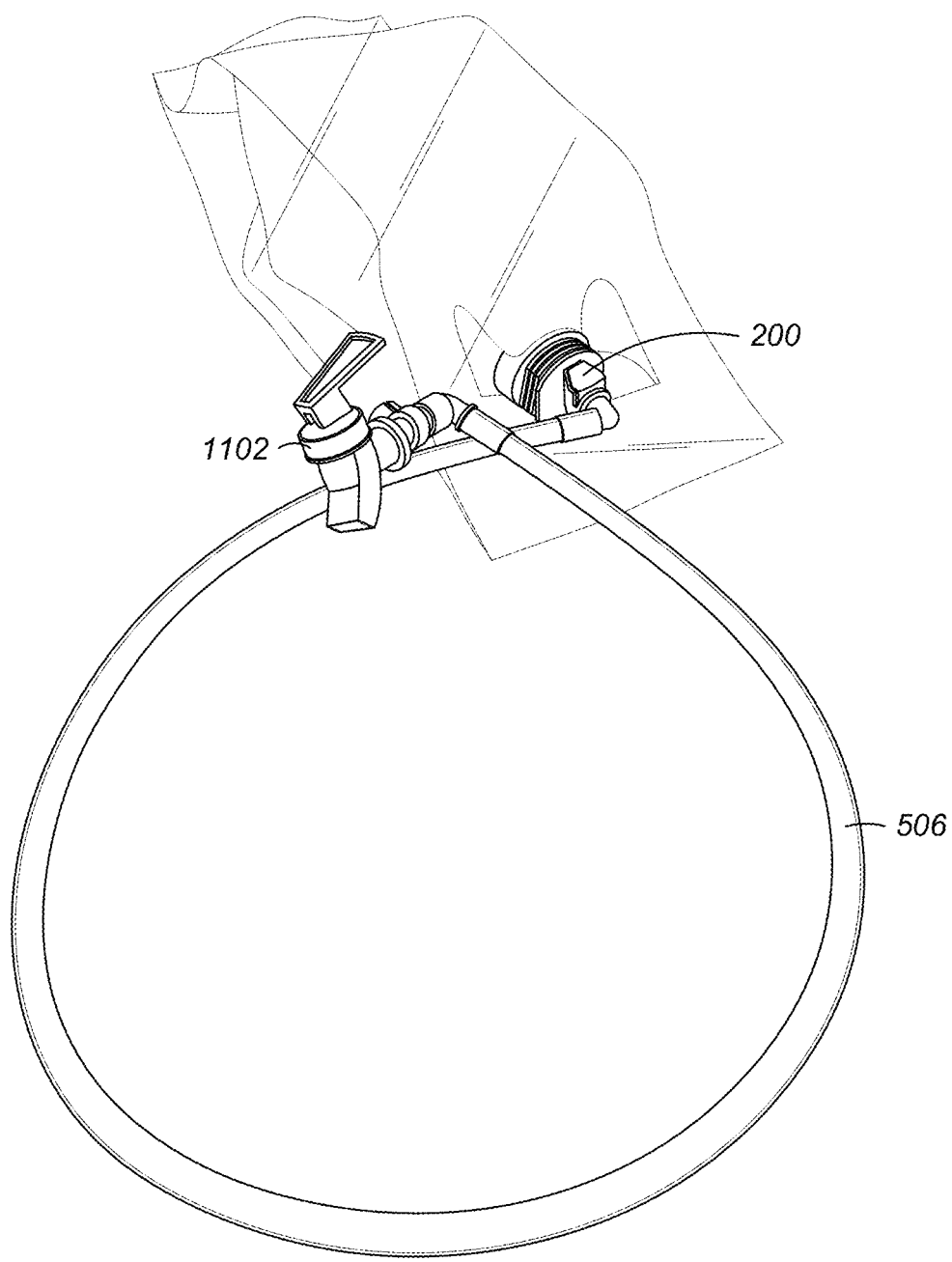

FIG. 13B is a diagram showing the spigot 1102 inserted into the female aperture portion 208 of attachment 508, thus configuring the system into a large vessel 802 providing consumable liquids to the spigot 1102 via an extended tube 506.

Figure 14:
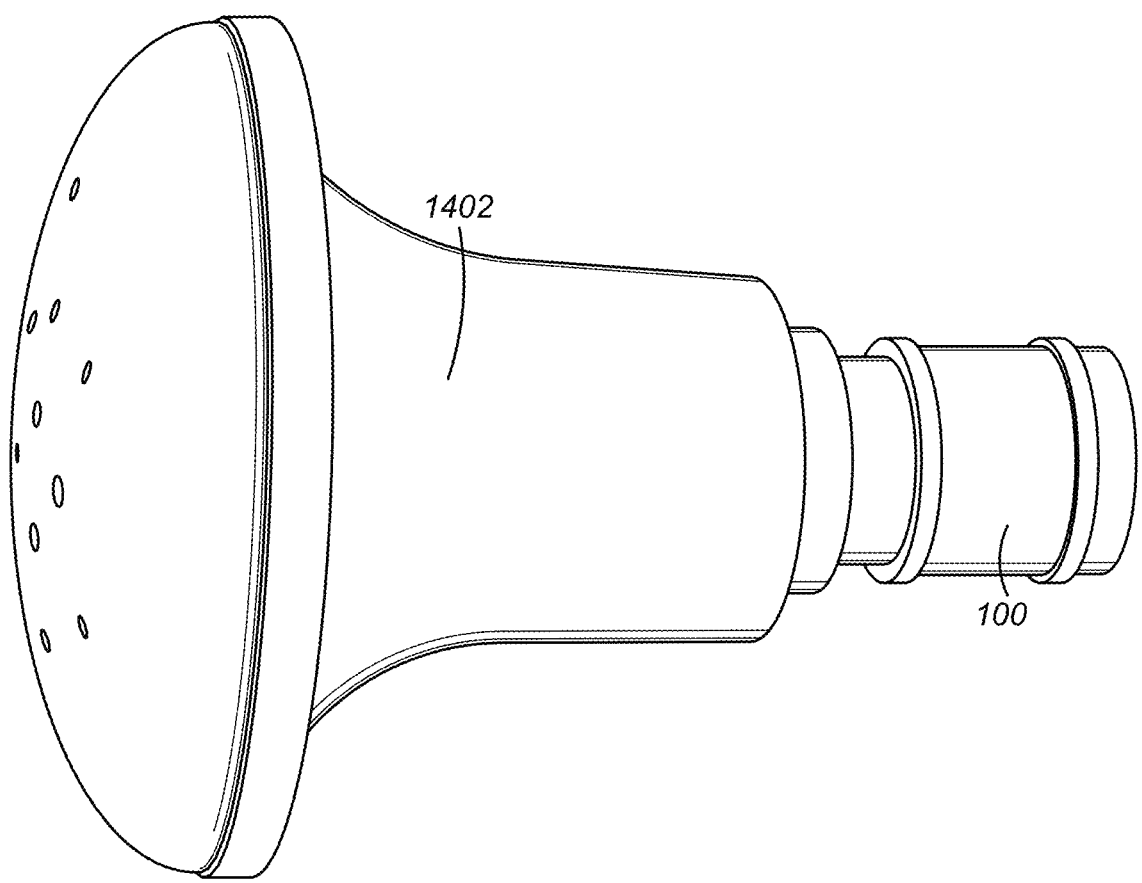

FIG. 14 is a diagram showing an dispersing head 1402, which can be used as a shower head or similar application. The dispersing head 1402 includes a male portion 216 for insertion into the female aperture portion 208 of the socket 200 or socket 508 (or similar structure).

Figure 15:
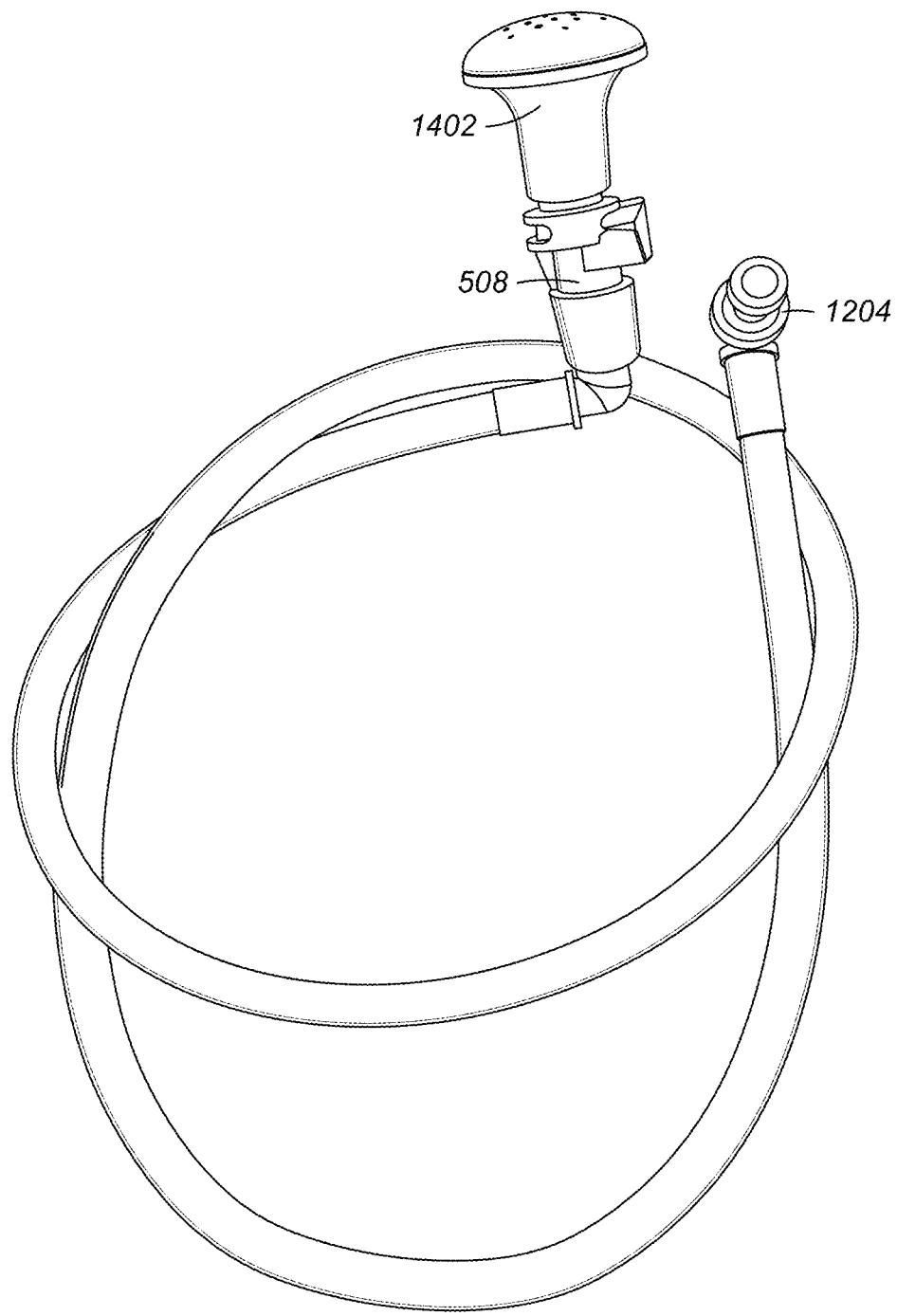

FIG. 15 is a diagram showing the dispersing head 1402 male portion 216 inserted into the female aperture portion 208 of the socket 508 having the right angle ribbed portion and the socket portion.

Figure 16:
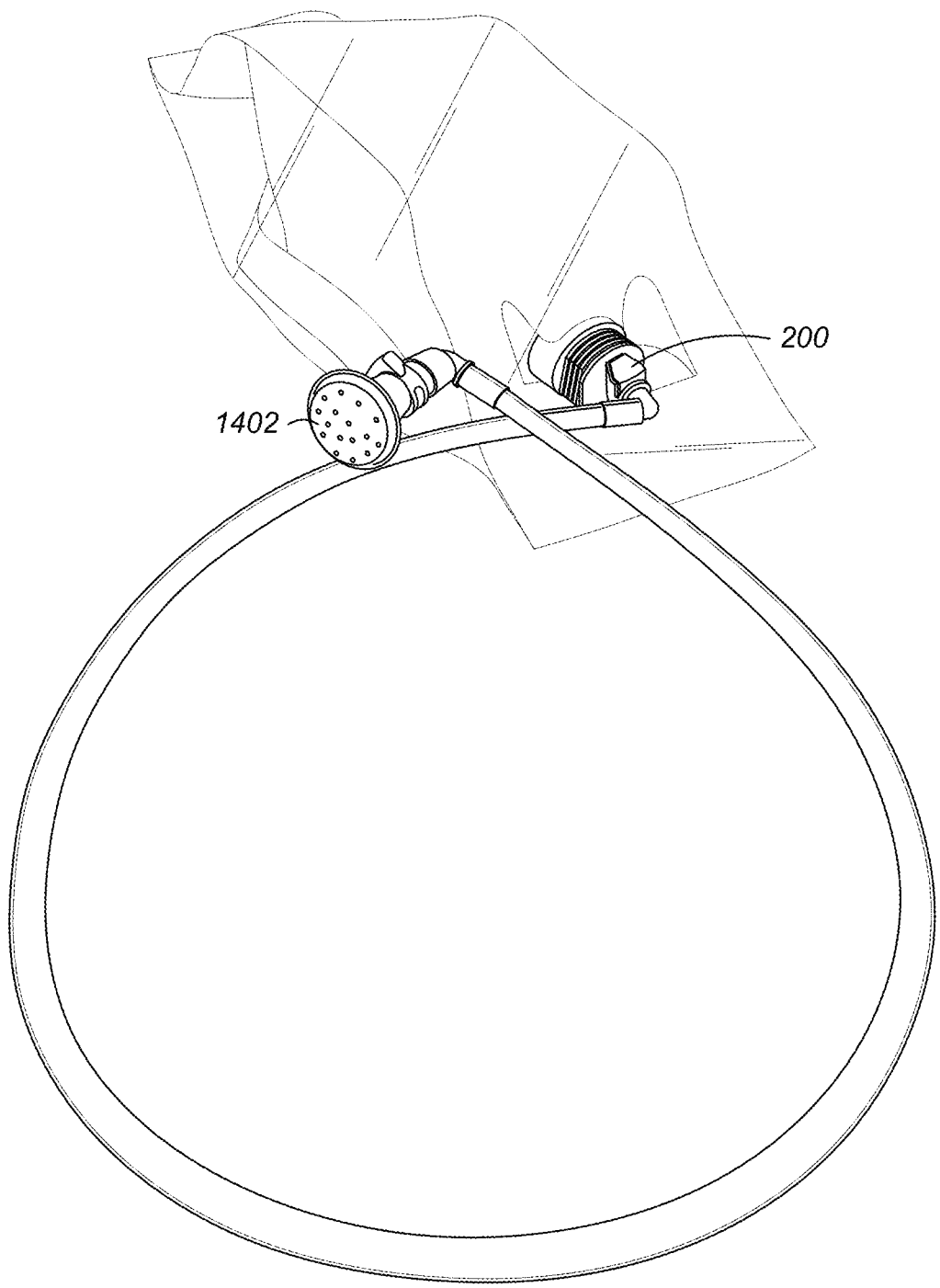

FIG. 16 is a diagram showing the dispersing head 1402 with the male portion 216 inserted into the female aperture portion 208 of the socket 508. In this configuration, the resulting system may be used as a shower. Although the vessel 800 is illustrated as orange, the vessel for such a configuration may be black or a similar color to absorb solar radiation and warm the liquid inside the vessel 802.

Figure 17:
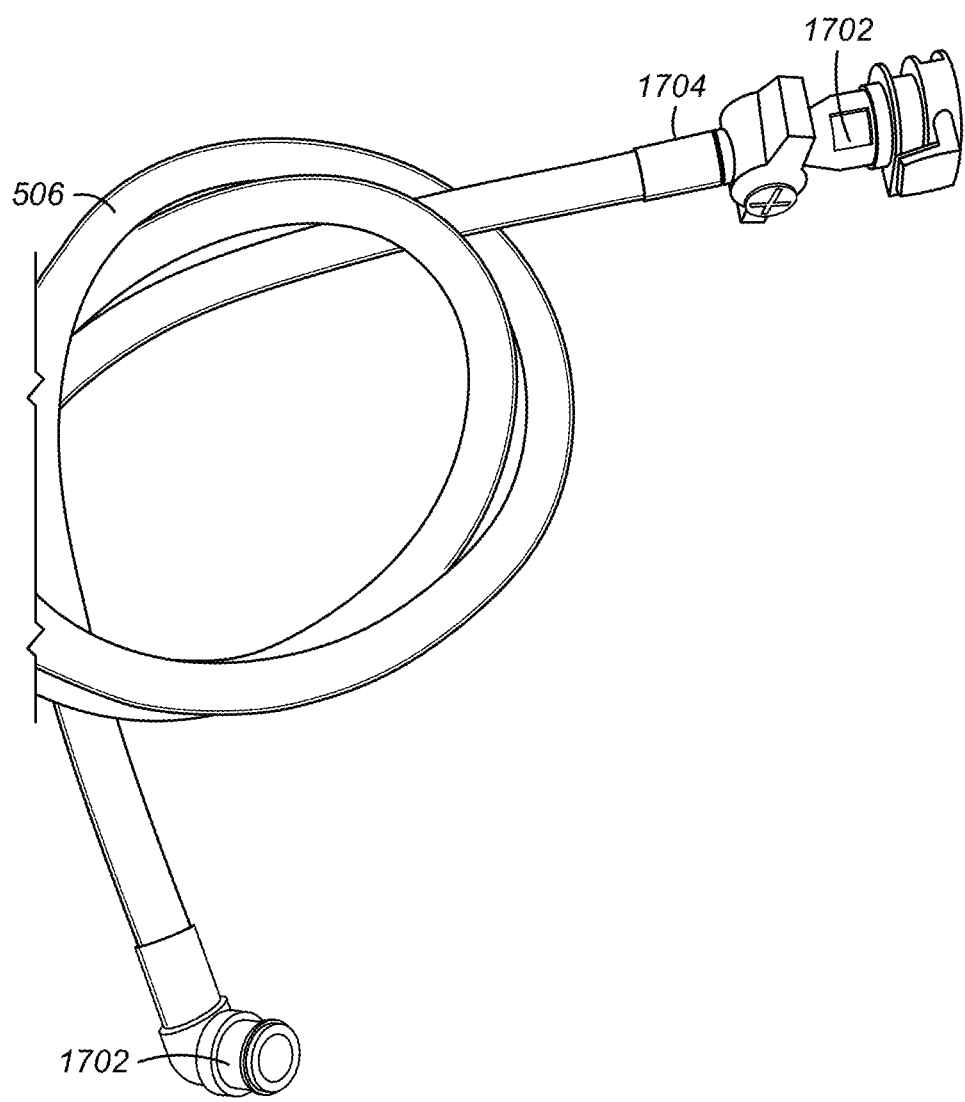

FIG. 17 is a diagram showing another embodiment of a socket 1702. In this embodiment, the socket 1702 as a structure analogous to that of socket 502, but no right angle bend. The socket 1702 has a ribbed portion 1704 that is inserted into one end of the tube 1206, and the ribbed portion of a right angle coupler 1706 is inserted into the other end of the tube. The right angle coupler 1706 includes a male portion 216 that can be inserted into the female aperture portion 208 of sockets 200 or 1202.

Figure 18:
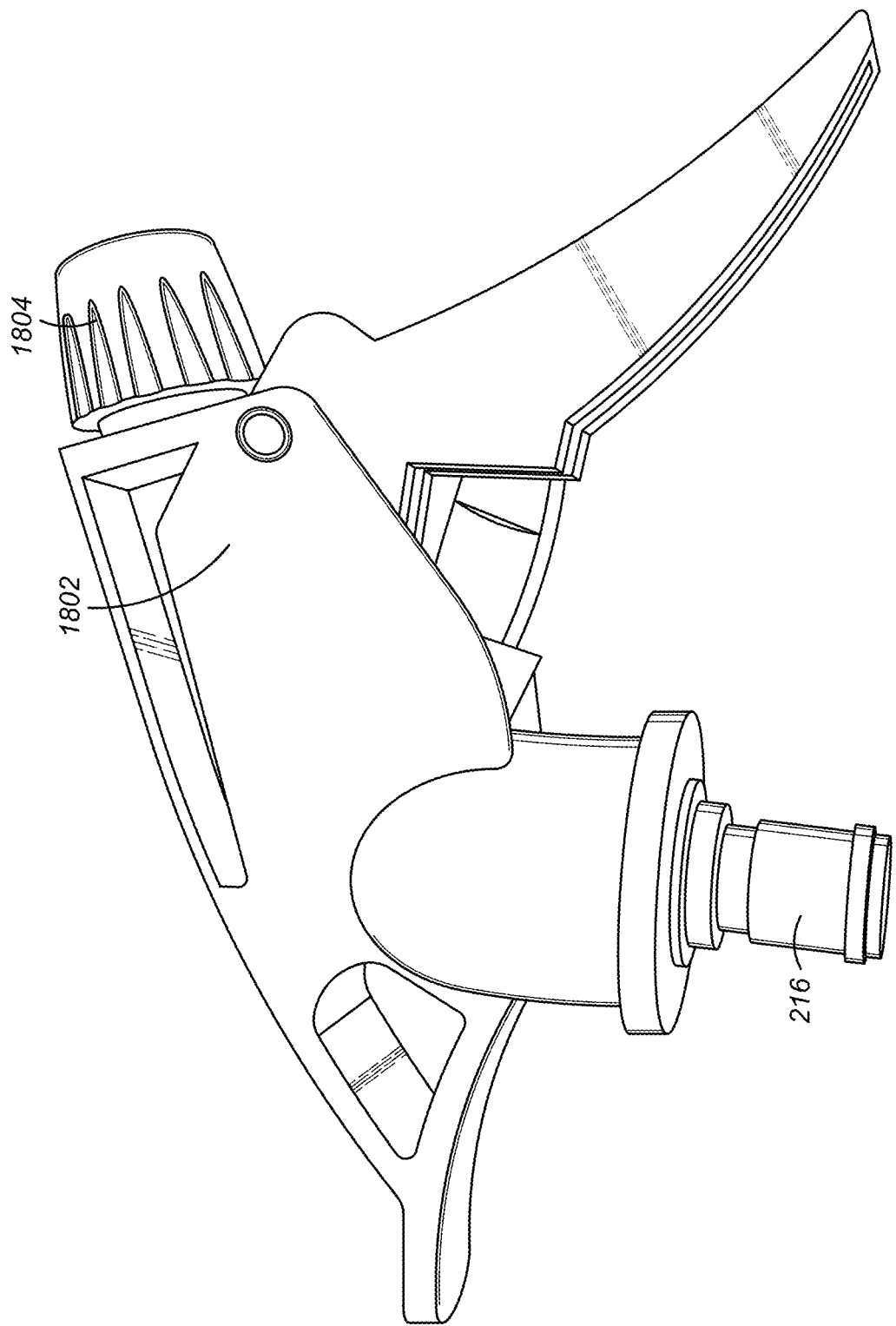

FIG. 18 is a diagram of a spray head 1802 having a male portion 216 that can be inserted into the female aperture portion 208 of sockets 200 or 1202.

Figure 19:
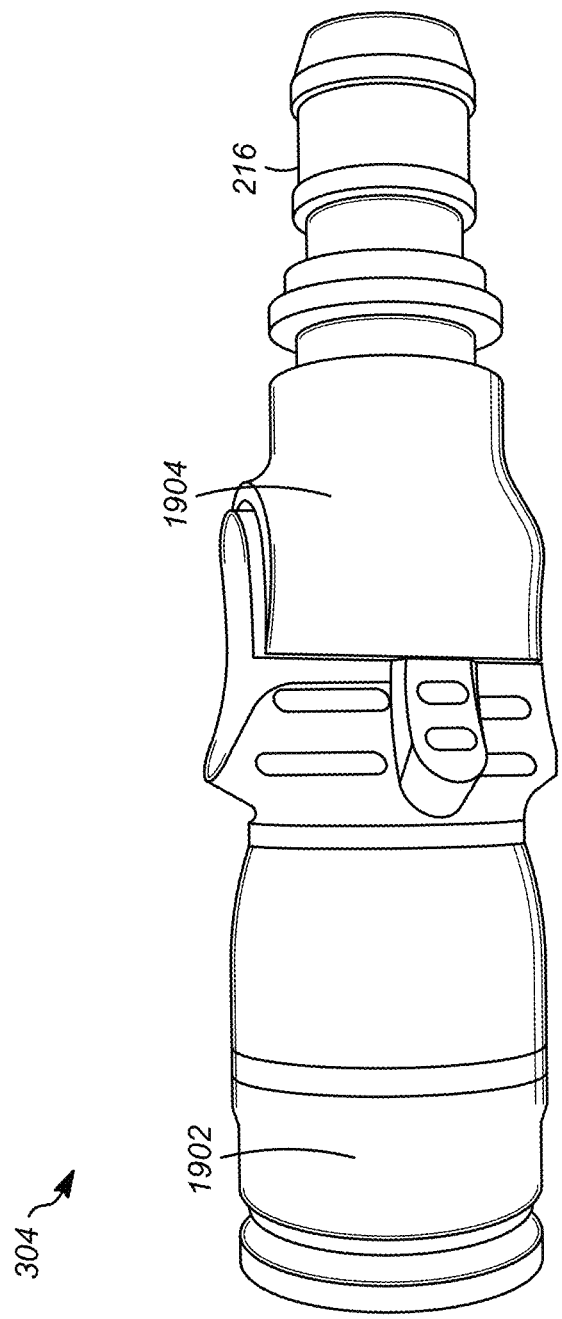

FIG. 19 is a diagram of the bite valve attachment 304. The bite valve attachment has a male portion 216 that can be inserted into the female aperture portion 208 of sockets 200 or 1202. This embodiment of the bite valve 1900 includes a waterproof joint 1904, allowing the bite valve portion 1902 to be oriented to be collinear with the male portion 216 or angled from being collinear by 90 degrees or more.

Figure 20:
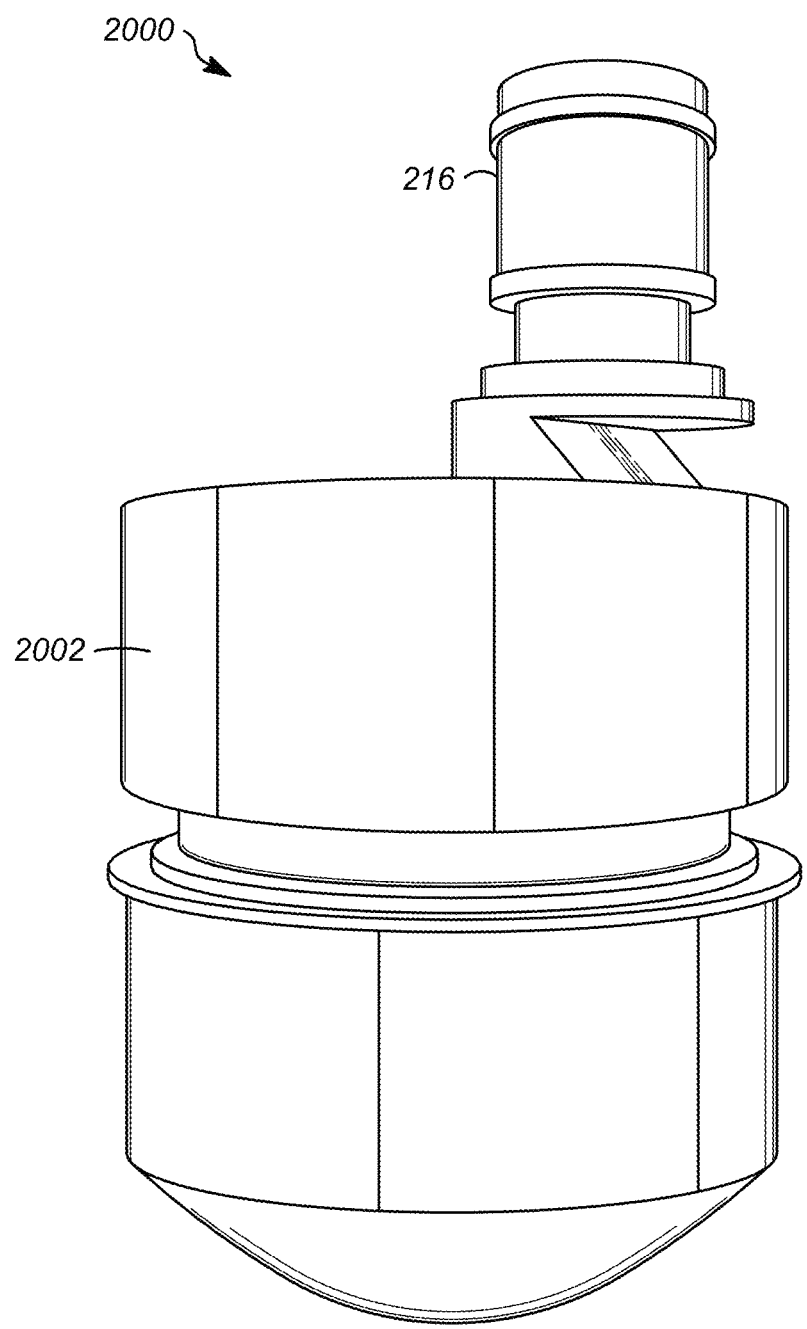

FIG. 20 is a diagram of a pet hydration attachment 2000 having a male portion 216 that can be inserted into the female aperture portion 208 of sockets 200 or 1202. The pet hydration attachment includes a module 2002 that accepts and presents fluid to the pet for drinking purposes.

Figure 21:
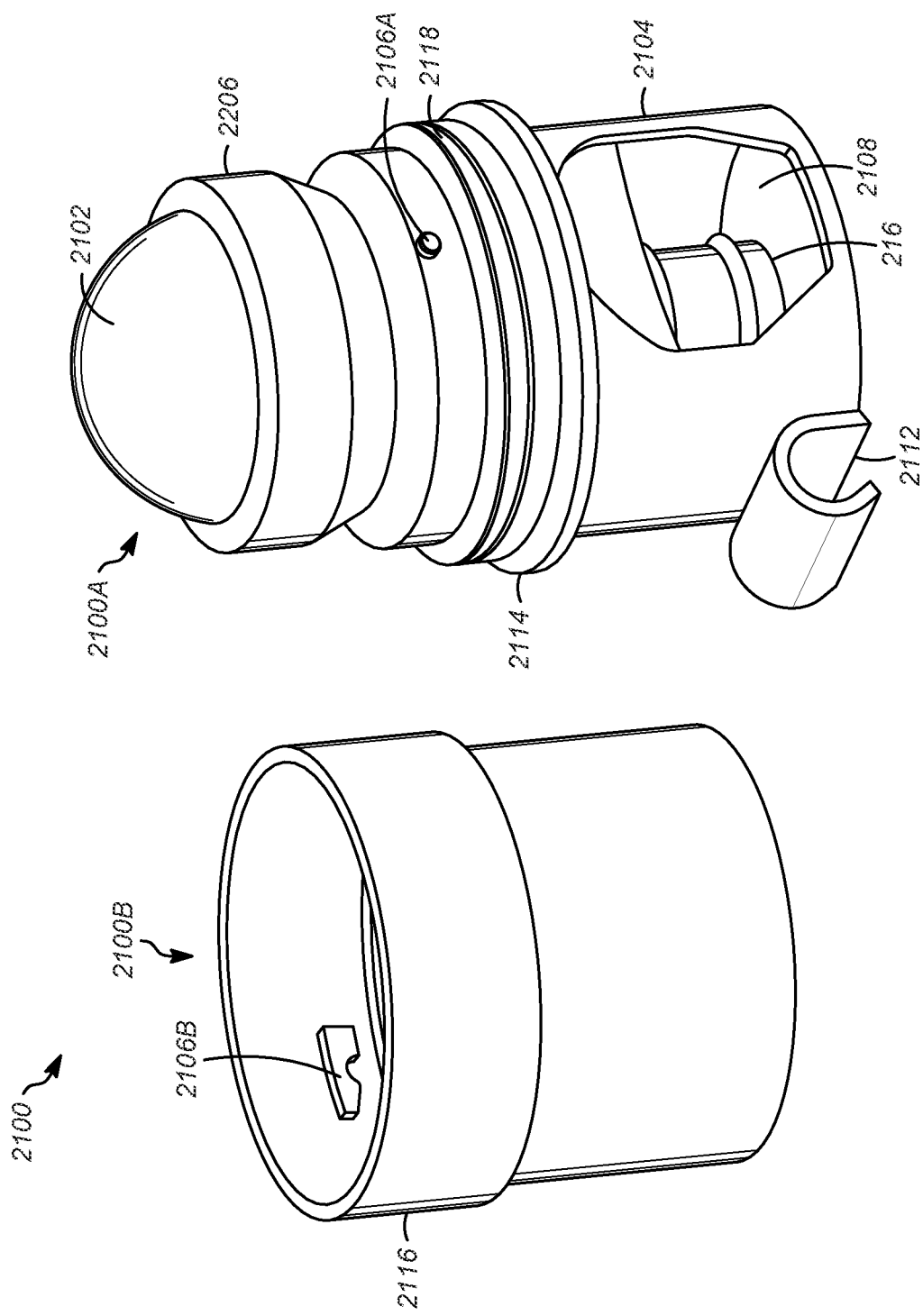
FIGS. 21-24 are diagrams depicting further embodiments of the pet hydration system.

FIG. 21 a diagram of another embodiment of a pet hydration attachment 2100 system. The pet hydration attachment system 2100 includes a pet hydration attachment 2100A and a cover 2100B. The cover member 2100B fits over the top of the pet hydration attachment 2100A, with lip 2114 against the rim of the cover member 2100B. Stop 2106B interfaces with tab 2106A to hold the cover 2100B on the pet hydration attachment 2100A upon rotation, and gasket 2118 forms a seal against an inner surface of the cover 2100B when in place.

The pet hydration attachment 2100A includes a spherical member 2102, and a cap member 2104. The cap member 2104 includes an aperture 2108 which accepts the latch 206 therein to secure the pet hydration attachment 2100A to the socket 200. Male portion 216 is inserted into female aperture portion 208 and secured by locking portion 214, to secure the pet hydration attachment 2100A in place. Optional carabiner attachment loop 2112 permits the attachment of a carabiner to the pet hydration attachment 2100A.

Figure 22:
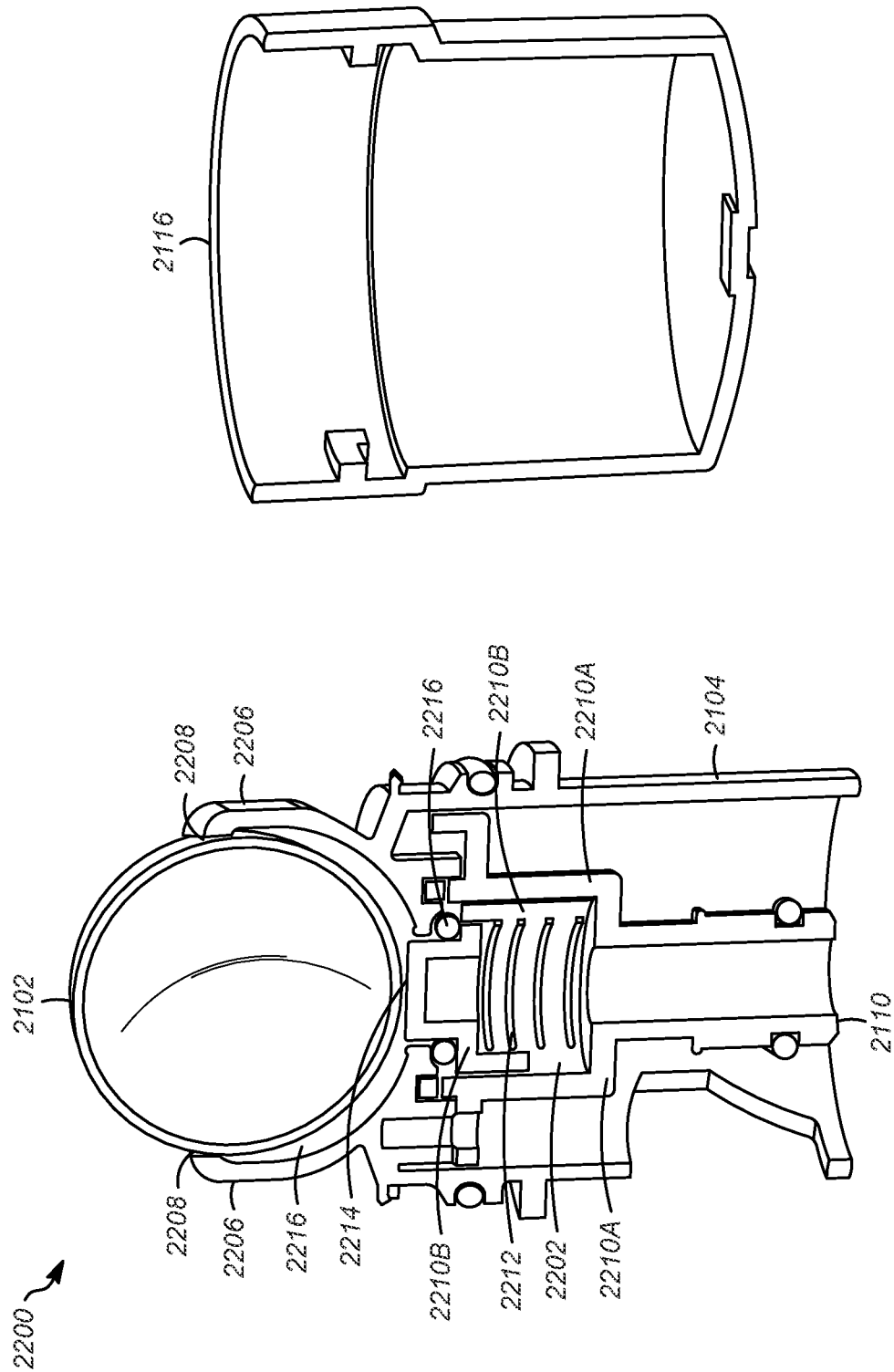

FIG. 22 is a diagram illustrating a cut away view of the pet hydration attachment 2100A and the cover 2100B. The pet hydration attachment 2100A includes the spherical member 2102, and the cap member 2104. In the illustrated embodiment, the spherical member 2102 is hollow.

The cap member 2104 comprises a concave member 2206. The concave member 2206 is adapted to accept a spherical cap of the spherical member having a polar angle of more than 180 degrees. This retains the spherical member 2102 within the concave member 2206.

The concave member has an interior surface having dimensions larger than the radius of the spherical member within the spherical cap, thus forming a volume between the spherical cap and the concave member.

In one embodiment, the concave member 2206 also has a circular lip surface 2208 which slidably and semi-sealingly contacts the surface of the spherical member. The circular lip comprises one or more slots inscribed therein to permit passage of liquid when the spherical member is urged into the cavity and rotated. In one embodiment, the slots are disposed on at least 4 sides of the circular lip surface, and interface between the outer surface of the spherical member 2102 and the inner surface of the circular lip surface 2208 at the location of the slots permit sufficient liquid to be dispensed upon simultaneous urging or depression of the spherical member 2102 within the concave member 2206 and rotation therein, as affected by a pet's tongue, licking the spherical surface.

Liquid is supplied to the volume 2216 by a valve 2210 in hydraulic communication with the volume 2216. The valve 2210 permits fluid communication between the volume 2216 and a vessel 100 sealingly affixed via a socket 200 in a first (open) configuration and prohibits fluid communication between the volume 2216 and the vessel 100 in a second (closed) configuration.

In the illustrated embodiment, the valve 2210 comprises a first valve member 2210A in fluid communication with the vessel 100 and a second valve member 2210B. The second valve member has a top surface 2214 disposed facing a bottom surface of the spherical member 2102, and is configured to slidably contact and be depressed by the spherical member 2102 when the spherical member 2102 is urged against a top surface 2214 of the second valve member 2102B. The valve 2210 also comprises a spring 2212 that urges the first valve member upwards to put the valve 2210 in the first (sealed) configuration.

In one embodiment, the spring 2212 has a spring or stiffness constant of 0.03-0.08 Newtons/mm, with a preferred value of 0.08 Newtons/mm. This very small spring constant was experimentally determined to be just sufficient to allow passage of liquid through the valve unless a pet's tongue was applied to the spherical member 2102, but great enough to prevent passage of liquid through the valve due to weight of the spherical member 2102 in any orientation of the pet hydration attachment 2100 and under normal dynamic conditions (e.g. movement). The spring may be made of SUS316 stainless steel, with an outer diameter of 10 mm, a length of 13.5 mm, a spring wire diameter of 0.4 mm and an effective winding number of 8, and elastic modulus E of $19*10^3$ kg/mm$^2$ and a modulus of rigidity G of $7*10^3$ kg/mm$^2$.

As illustrated, the second valve member 2210B fits within the first valve member, and permits fluid communication between the volume 2216 and the vessel 100 only when the second valve member 2210B is depressed toward and further within the first valve member 2210A. In this embodiment, the spring 2212 fits within the first valve member 2210A and provides a small force opposing the depression of the second valve member 2210B toward and further within the first valve member 2210A.

Figure 23:
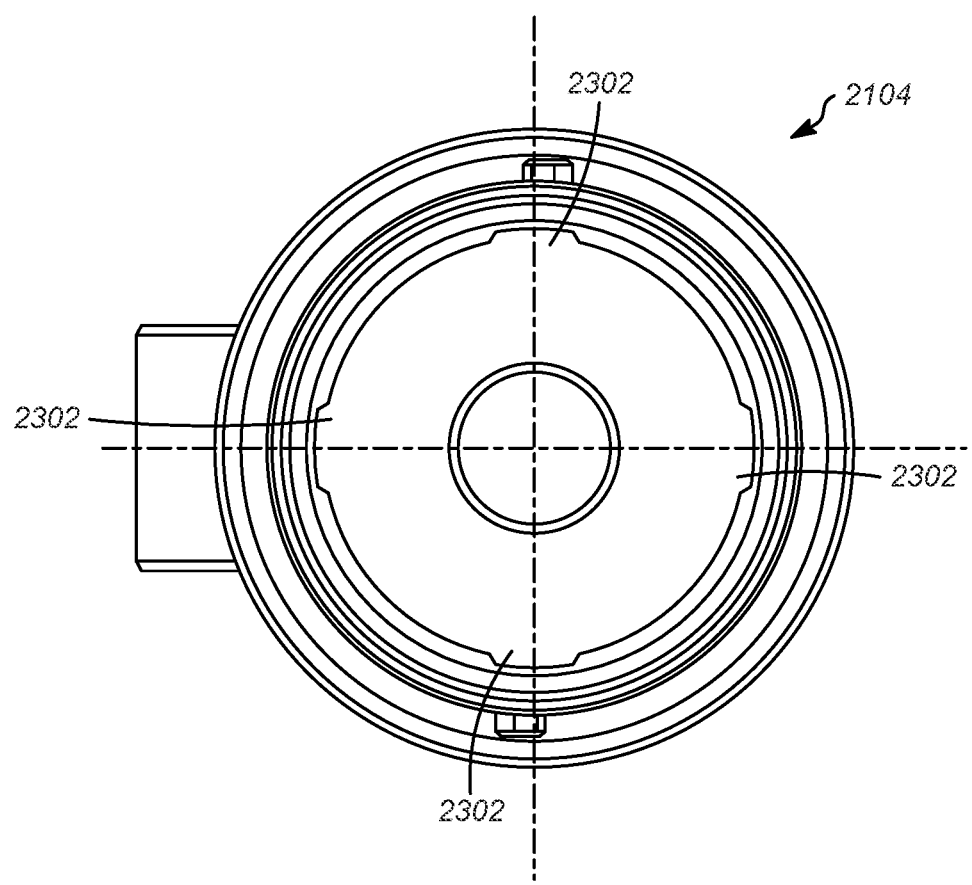

FIG. 23 is a diagram illustrating a top view of the cap member 2104, illustrating the slots 2302 in the has a circular lip surface. In one embodiment, the slots are 0.6 mm×5 mm, which permits the flow of a sufficient amount of liquid. In another embodiment, two diametrically opposed 0.6 mm×8 mm slots are used, with the inner diameter of the camp member being 32.2 mm.

Figure 24:
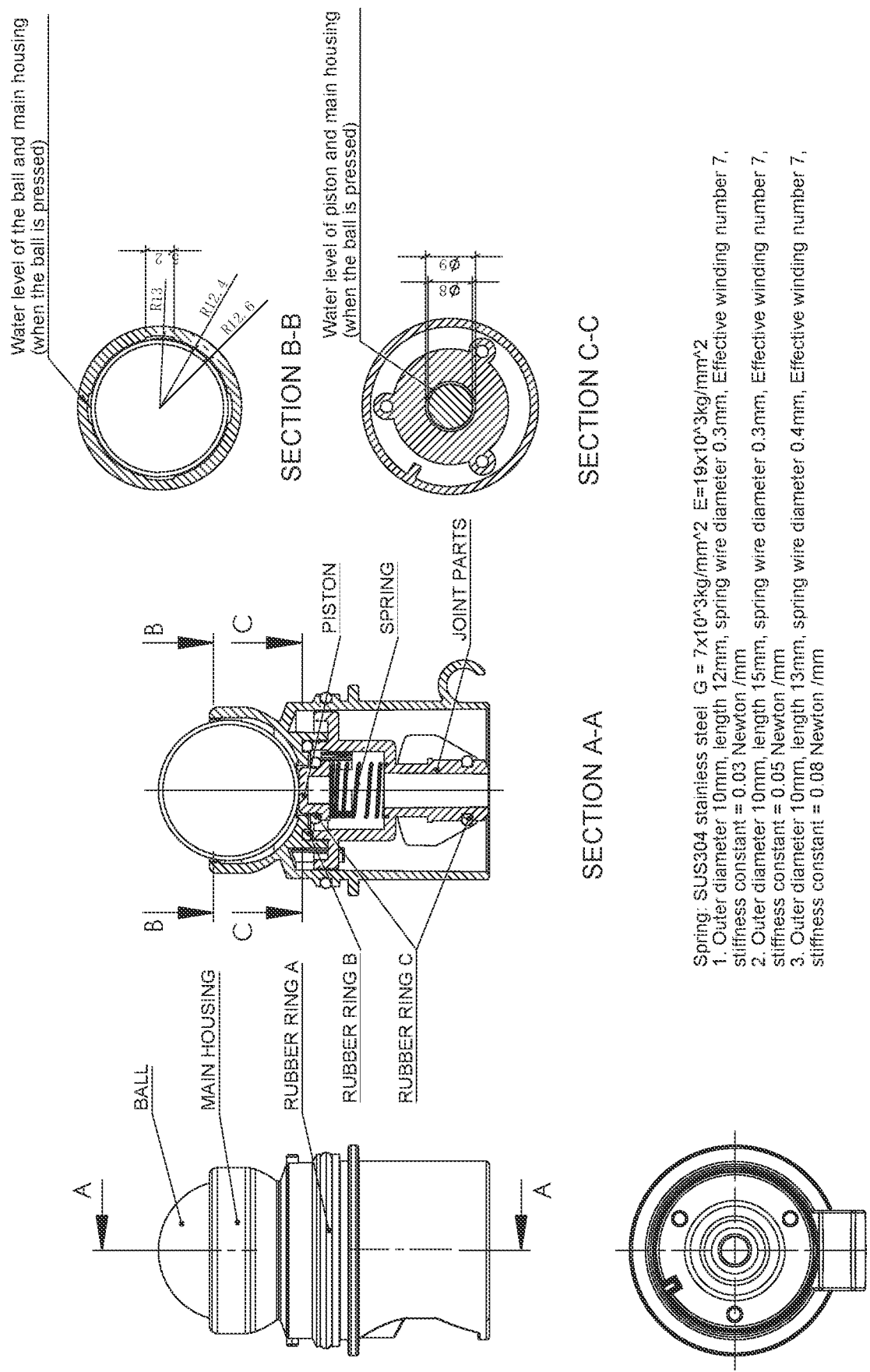

FIG. 24 is a diagram illustrating a further embodiment of the pet hydration attachment 2100A. As shown, spring 2212 is comprises of USU304 stainless steel, with the steel having the indicated properties. The spring 2100A may have a spring constant of 0.03 Newton/mm, 0.05 Newton/mm or 0.08 Newton/mm, depending on the application. The water level of the ball and the main housing (when the ball is depressed by the pet licking the ball) is shown, as well as the water level of the piston and main housing when the ball is pressed, showing a gap of approximately 1 mm.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. The claim appended hereto describes features of the subject of this application in detailed terms, including optional features that might be useful in some embodiments, but not required for all embodiments, and is presented for purposes of describing claim features that might be included in various combinations thereof.

What is claimed is:

1. An apparatus for dispensing a liquid when licked, comprising:
    a spherical member;
    a cap member, the cap member comprising:
        a concave member, the concave member adapted to accept the spherical member, the concave member having a polar angle of more than 180 degrees of the substantially spherical member within the concave member, thereby retaining the spherical member within the concave member while forming a volume therebetween; and
        a valve, in sealed hydraulic communication with the volume between the spherical member and the concave member, the valve permitting fluid communication between the volume and a vessel sealingly affixed to the cap member in a first configuration and prohibiting fluid communication between the volume and the vessel in a second configuration, the valve configured to in the first configuration when the spherical member is urged into the cap member;

wherein the circular lip surface has one or more slots inscribed therein configured to permit passage of liquid when the spherical member is urged into the concave member and rotated.

2. The apparatus of claim 1, wherein the concave member has a circular lip surface slidably and semi-sealingly contacting a surface of the spherical member.

3. The apparatus of claim 1, wherein the one or more slots comprise two diametrically opposed slots.

4. The apparatus of claim 3, wherein the two diametrically disposed slots are approximately 0.6 millimeters by 0.8 millimeters.

5. The apparatus of claim 1, wherein the valve comprises:
a first valve member in fluid communication with the vessel;
a second valve member, the second valve member having a top surface disposed facing a bottom surface of the spherical member, and configured to slidably contact and be depressed by the spherical member when the spherical member is urged against a top surface of the second valve member; and
a spring, urging the first valve member to the first configuration.

6. The apparatus of claim 5, wherein the second valve member permits fluid communication between the volume and the vessel only when the second valve member is depressed by the spherical member.

7. The apparatus of claim 6, wherein the spring having a stiffness constant of 0.03-0.08 Newtons/mm.

8. The apparatus of claim 7, wherein the second valve member is inserted into the first valve member with the spring therebetween.

9. A method of providing a liquid to a pet, comprising:
connecting a removable pet hydration attachment to a source of the liquid, the removable pet hydration attachment comprising:
a spherical member;
a cap member, the cap member comprising:
a concave member, the concave member adapted to accept the spherical member, the concave member having a polar angle of more than 180 degrees of the substantially spherical member within the concave member, thereby retaining the spherical member within the concave member while forming a volume therebetween; and
a valve, in sealed hydraulic communication with the volume between the spherical member and the concave member, the valve permitting fluid communication between the volume and a vessel sealingly affixed to the cap member in a first configuration and prohibiting fluid communication between the volume and the vessel in a second configuration, the valve configured to in the first configuration when the spherical member is urged into the cap member;
providing the removable pet hydration attachment to the pet; and
dispensing the liquid when the removable pet hydration attachment is licked;
wherein the circular lip surface has one or more slots inscribed therein configured to permit passage of liquid when the spherical member is urged into the concave member and rotated.

10. The method of claim 9, wherein the concave member has a circular lip surface slidably and semi-sealingly contacting a surface of the spherical member.

11. The method of claim 9, wherein the one or more slots comprise two diametrically opposed slots.

12. The method of claim 11, wherein the two diametrically disposed slots are approximately 0.6 millimeters by 0.8 millimeters.

13. The method of claim 9, wherein the valve comprises:
a first valve member in fluid communication with the vessel;
a second valve member, the second valve member having a top surface disposed facing a bottom surface of the spherical member, and configured to slidably contact and be depressed by the spherical member when the spherical member is urged against a top surface of the second valve member; and
a spring, urging the first valve member to the first configuration.

14. The method of claim 13, wherein the second valve member permits fluid communication between the volume and the vessel only when the second valve member is depressed by the spherical member.

15. The method of claim 14, wherein the spring having a stiffness constant of 0.03-0.08 Newtons/mm.

16. The method of claim 15, wherein the second valve member is inserted into the first valve member with the spring therebetween.

\* \* \* \* \*